US010866383B2

(12) United States Patent
Son et al.

(10) Patent No.: US 10,866,383 B2
(45) Date of Patent: Dec. 15, 2020

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventors: Byung Wook Son, Seoul (KR); Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 59 days.

(21) Appl. No.: 15/778,131

(22) PCT Filed: Nov. 18, 2016

(86) PCT No.: PCT/KR2016/013337
§ 371 (c)(1),
(2) Date: May 22, 2018

(87) PCT Pub. No.: WO2017/090940
PCT Pub. Date: Jun. 1, 2017

(65) Prior Publication Data
US 2018/0348469 A1 Dec. 6, 2018

(30) Foreign Application Priority Data
Nov. 25, 2015 (KR) .................. 10-2015-0165306

(51) Int. Cl.
G02B 7/02 (2006.01)
G02B 7/09 (2006.01)
(Continued)

(52) U.S. Cl.
CPC .............. G02B 7/09 (2013.01); G02B 7/025 (2013.01); G03B 3/10 (2013.01); G03B 5/00 (2013.01);
(Continued)

(58) Field of Classification Search
CPC .......... G02B 7/08; G02B 27/646; G02B 7/09; G02B 7/102; G02B 7/02; G02B 13/001;
(Continued)

(56) References Cited

U.S. PATENT DOCUMENTS

2012/0026611 A1 2/2012 Hu et al.
2015/0177479 A1 6/2015 Lee et al.
(Continued)

FOREIGN PATENT DOCUMENTS

JP 2013-228610 A 11/2013
JP 2014-056031 A 3/2014
(Continued)

OTHER PUBLICATIONS

International Search Report in International Application No. PCT/KR2016/013337, filed Nov. 18, 2016.

Primary Examiner — Brandi N Thomas
(74) Attorney, Agent, or Firm — Saliwanchik, Lloyd & Eisenschenk

(57) ABSTRACT

One embodiment comprises: a housing; a bobbin, which is arranged inside the housing and is for mounting a lens; first coils arranged around the outer peripheral surface of the bobbin; a first magnet arranged in the housing; a second magnet arranged at the bobbin and spaced from the first coils; and a first position sensor arranged in the housing and sensing the intensity of a magnetic field of the second magnet, wherein the length of the second magnet in the direction of an optical axis is shorter than the length of thereof in the direction perpendicular to the direction of the optical axis.

18 Claims, 16 Drawing Sheets

(51) Int. Cl.
*G03B 3/10* (2006.01)
*H02K 33/16* (2006.01)
*G03B 5/00* (2006.01)
*H02K 11/215* (2016.01)
*H02K 41/035* (2006.01)

(52) U.S. Cl.
CPC .......... *H02K 11/215* (2016.01); *H02K 33/16* (2013.01); *H02K 41/0356* (2013.01); *G03B 2205/0069* (2013.01)

(58) Field of Classification Search
CPC ........ G02B 7/023; G02B 7/028; G02B 7/105; G02B 7/28; G02B 2006/12164; G02B 26/085; G02B 6/12; G02B 6/12002; G02B 6/12011; G02B 6/2938; G02B 7/00; G02B 7/025; G02B 7/04; G02B 7/10

USPC .................... 359/811, 813, 815, 819–824
See application file for complete search history.

(56) References Cited

U.S. PATENT DOCUMENTS

2015/0253583 A1* 9/2015 Cho .................. H02K 41/0356
 348/360
2015/0362696 A1* 12/2015 Han ..................... G02B 27/646
 359/824

FOREIGN PATENT DOCUMENTS

| KR | 10-2011-0088249 A | 8/2011 |
| KR | 10-1343197 B1 | 12/2013 |
| KR | 10-2015-0104009 A | 9/2015 |
| KR | 10-2015-0128262 A | 11/2015 |

\* cited by examiner

# LENS DRIVING DEVICE, AND CAMERA MODULE AND OPTICAL DEVICE INCLUDING SAME

CROSS-REFERENCE TO RELATED APPLICATIONS

This application is the U.S. national stage application of International Patent Application No. PCT/KR2016/013337, filed Nov. 18, 2016, which claims priority to Korean Application No. 10-2015-0165306, filed Nov. 25, 2015, the disclosures of each of which are incorporated herein by reference in their entirety.

TECHNICAL FIELD

Embodiments relate to a lens driving device, and a camera module and an optical device including the same.

BACKGROUND ART

It is difficult to apply a technology of a VCM (voice coil motor) applied to a legacy general camera module to a subminiature and low power consuming camera module. Hence, a study on the subminiature and low power consuming camera module has been actively performed.

Demand and production of electronic products such as a smartphone and a cellular phone equipped with a camera are increasing. Recently, a high-resolution and miniature camera is mounted on a cellular phone. Hence, an actuator is also miniaturized, has a large caliber, and is multi-functionalized. In order to implement a high-resolution camera mounted on a cellular phone, it is necessary to enhance performance of the camera and have such an additional function as auto-focusing, enhancement for inhibiting shutter movement, a zoom function, and the like.

DISCLOSURE OF THE INVENTION

Technical Task

According to embodiments of the present invention, it is able to provide a lens driving device capable of securing precise AF driving by suppressing interference between a magnet for driving and a magnet for sensing and obtaining a position sensor output of a preferred range, and a camera module and an optical device including the same.

Technical Solution

To achieve these and other advantages and in accordance with the purpose of the present invention, as embodied and broadly described, according to one embodiment, a lens driving device includes a housing, a bobbin disposed in the housing for installing a lens, a first coil disposed on an outer circumference surface of the bobbin, a first magnet disposed on the housing, a second magnet disposed on the bobbin and the second magnet separated from the first coil, and a first position sensor disposed on the housing and configured to sense strength of a magnetic field of the second magnet. In this case, a length of the second magnet in an optical axis direction is shorter than a length of the second magnet in a direction perpendicular to the optical axis direction.

The second magnet can include a lower surface, an upper surface, and a side surface positioned between the lower surface and the upper surface and a distance between the upper surface and the lower surface can be shorter than a distance between two sides facing each other of the upper surface.

The second magnet may correspond to a polyhedron having a shape of a plate.

A width of at least a part of the second magnet increases in a direction heading towards a second side from a first side of an upper surface of the second magnet, the first side corresponds to a side adjacent to an inner circumference surface of the housing, and the second side may correspond to a side facing the outer circumference surface of the bobbin and the first side.

The bobbin comprises a mounting groove provided at an upper surface of the bobbin for the second magnet and a width of the mounting groove increases in a direction heading towards an inner circumference surface from the outer circumference surface of the bobbin.

The length of the second magnet in the direction of the optical axis is constant.

A width of the second magnet increases in a direction heading towards a second side from a first side of an upper surface of the second magnet, the first side corresponds to a side adjacent to an inner circumference surface of the housing, and the second side may correspond to a side facing the outer circumference surface of the bobbin and the first side.

An upper surface and a lower surface of the second magnet may have the same shape.

An upper surface of the second magnet may have a shape of a trapezoid that the first side corresponds to an upper side and the second side corresponds to a lower side.

The length of the second magnet in the optical axis direction increases in a direction heading towards a second side from a first side of an upper surface of the second magnet, the first side corresponds to a side adjacent to an inner circumference surface of the housing, and the second side may correspond to a side facing the outer circumference surface of the bobbin and the first side.

The second magnet includes a first part including a first side and a second part including a second side and the second part contacted with the first part, the first side corresponds to a side of an upper surface of the second magnet adjacent to an inner circumference surface of the housing, the second side corresponds to a different side of the upper surface of the second magnet facing the outer circumference surface of the bobbin and the first side, and a width of at least one of the first part and the second part may increase in a direction heading towards the second side from the first side of the upper surface.

The housing includes first sides and second sides, the first magnet is disposed on the first sides, and the first positon sensor can be disposed on one of the second sides.

The lens driving device can further include a circuit board disposed on the one of the second sides and comprises pads electronically connected with the first position sensor.

The lens driving device can further include an upper elastic member and a lower elastic member connected with the bobbin and the housing. In this case, the upper elastic member is divided into a plurality of upper elastic members and a plurality of the upper elastic members can be electronically connected with the pads.

The lens driving device can further include supporting members configured to electronically connect a plurality of the upper elastic members with the circuit board.

A boundary between N pole and S pole of the second magnet can be positioned between the lower surface and the upper surface in a manner of being parallel to the upper surface.

The lens driving device can further include a third magnet having a shape identical to a shape of the second magnet and disposed on the bobbin to face the second magnet.

The second magnet may not be overlapped with the first magnet in a direction perpendicular to the optical axis direction at an initial position of the bobbin.

To further achieve these and other advantages and in accordance with the purpose of the present invention, as embodied and broadly described, according to a different embodiment, a camera module includes a lens, a lens driving device configured to move the lens, an image sensor configured to covert an image emitted via the lens driving device into an electrical signal, and a first controller configured to provide a driving signal to each of the first coil and the first position sensor, the first controller configured to receive an output of the first position sensor.

To further achieve these and other advantages and in accordance with the purpose of the present invention, as embodied and broadly described, according to a further different embodiment, an optical device includes a display module including a plurality of pixels of which color is changed by an electrical signal, a camera module configured to covert an image emitted via a lens into an electrical signal, and a second controller configured to control the display module and the camera module.

Advantageous Effects

According to embodiments of the present invention, it is able to secure precise AF driving by suppressing interference between a magnet for driving and a magnet for sensing and obtain a position sensor output of a preferred range.

BEST MODE

Mode for Invention

Figure 1:
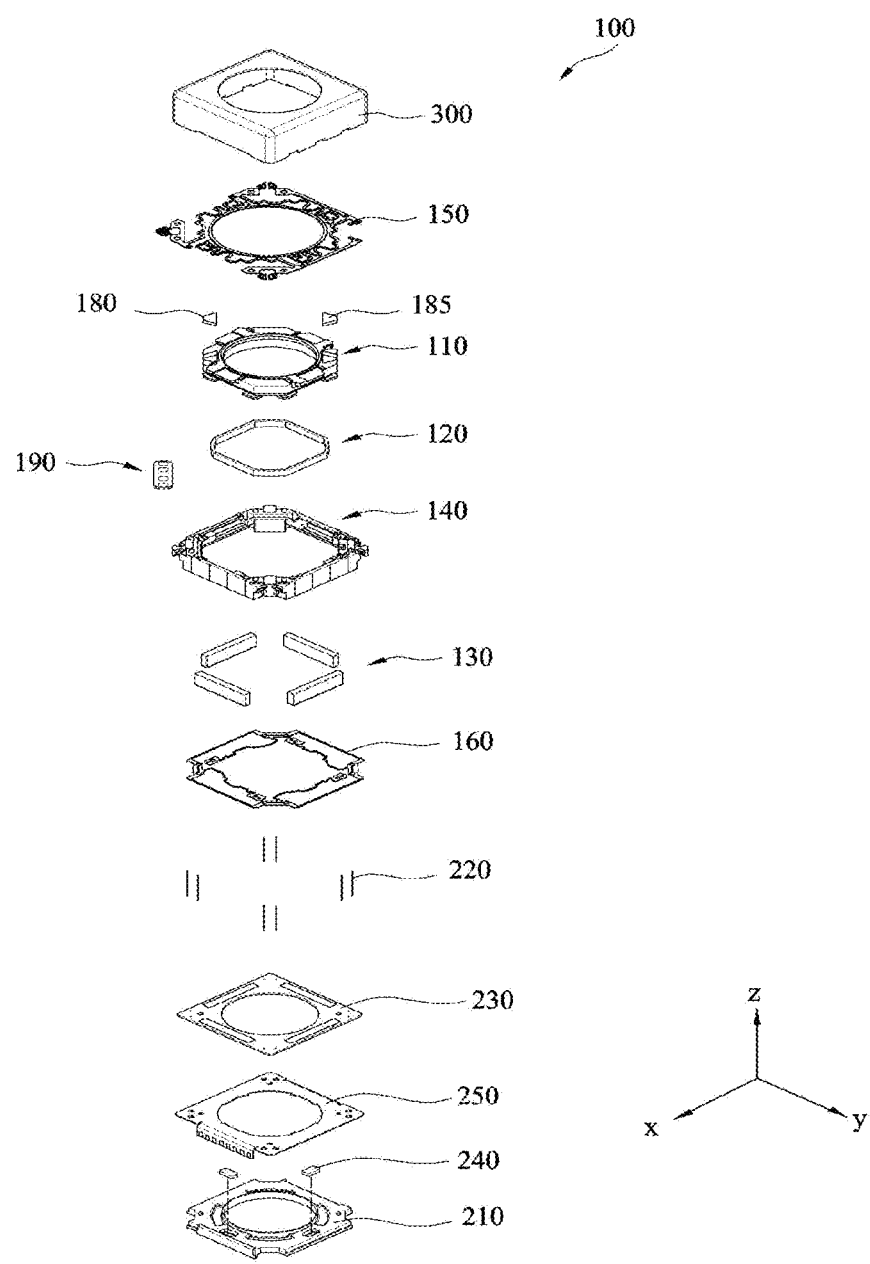
FIG. 1 is a perspective diagram for a lens driving device according to an embodiment.

In the following, embodiments will be clearly revealed through the description for the attached drawings and the embodiments. When the embodiments are described, if it is described as a layer (or film), a region, a pattern or a structure is formed "up/on" or "down/under" a board, a layer (film), a region, a pad, or a pattern, "up/on" and the "down/under" include not only a directly forming case but also an indirectly forming case via an another layer. A reference for "up/on" or "down/under" of a layer is explained on the basis of a drawing.

In the drawings, a size may be exaggerated, omitted or schematically illustrated for clarity. A size of each configuration element does not fully reflect an actual size. In addition, the same reference number indicates the same element throughout the description of the drawings.

In the following, a lens driving device according to an embodiment is explained with reference to the attached drawing. For clarity, the lens driving device is explained using a Cartesian coordinate system (x, y, z). Yet, it may also be able to explain the lens driving device using a different coordinate system. The embodiment is not restricted by the coordinate system. In each drawing, x axis and y axis correspond to directions perpendicular to z axis corresponding to an optical axis direction. The z axis direction corresponding to the optical axis direction is referred to as 'first direction', the x axis direction is referred to as 'second direction', and the y axis direction can be referred to as 'third direction'.

An image stabilization device applied to a compact camera module of a mobile device (e.g., smartphone, tablet PC, etc.) may correspond to a device configured to inhibit an outline of a captured image from being blurred due to vibration of a hand tremor of a user when the user captures a still image.

And, an auto-focusing device corresponds to a device configured to automatically focus an image of a subject on an image sensor surface. The image stabilization device and the auto-focusing device can be configured in various ways. The lens driving device according to the embodiment of the present invention can perform an image stabilization operation and/or an auto-focusing operation by moving an optical module configured by at least one lens in a first direction parallel to an optical axis or moving the optical module on a surface formed by a second and a third direction perpendicular to the first direction.

Figure 2:
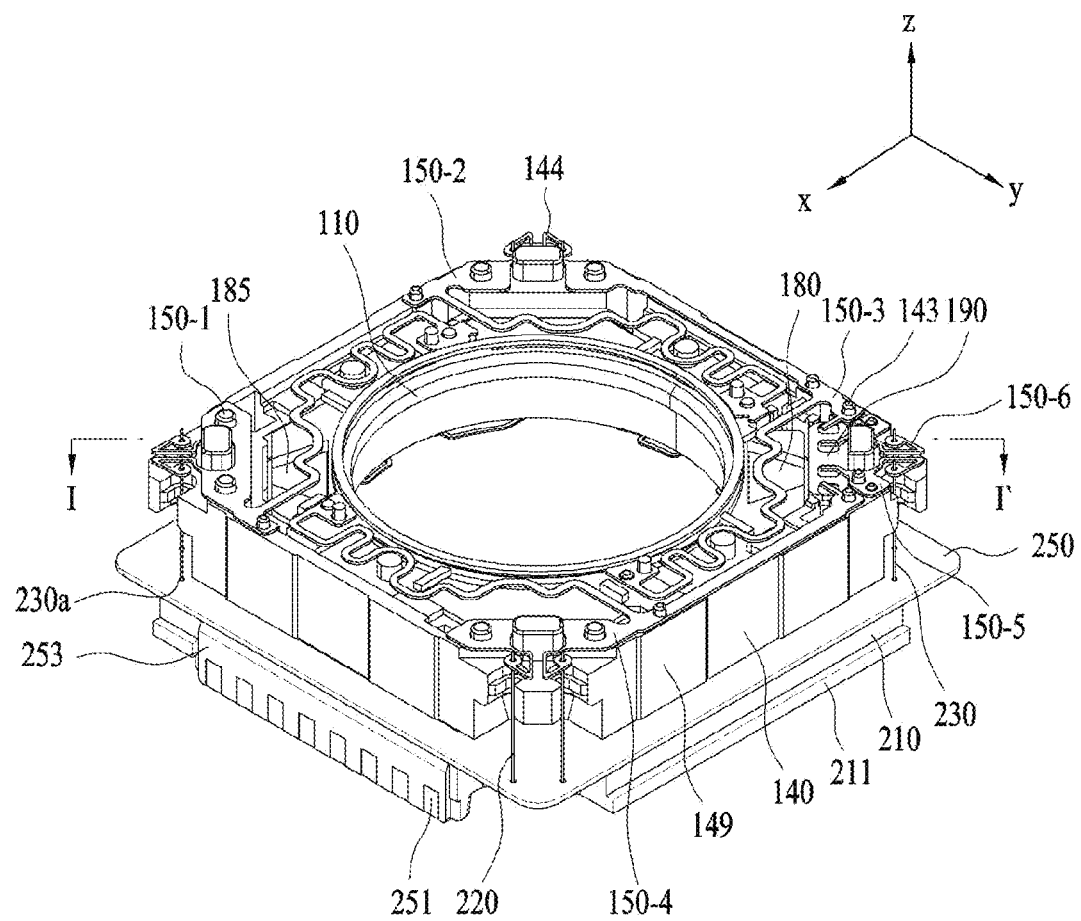
FIG. 2 is a perspective diagram for a lens driving device except a cover member shown in FIG. 1.

FIG. 1 is a perspective diagram for a lens driving device 100 according to an embodiment and FIG. 2 is a perspective diagram for a lens driving device except a cover member 300 shown in FIG. 1.

Referring to FIGS. 1 and 2, the lens driving device 100 includes a bobbin 110, a first coil 120, a first magnet 130, a housing 140, an upper elastic member 150, a lower elastic member 160, a first position sensor 170, and a second magnet 180.

The lens driving device 100 can further include a third magnet 185, a board 190, a supporting member 220, a second coil 230, a second position sensor 240, a circuit board 250, a base 210, and a cover member 300.

First of all, a cover member 300 is explained.

The cover member 300 includes a bobbin 110, a first coil 120, a first magnet 130, a housing 140, an upper elastic member 150, a lower elastic member 160, a first position sensor 170, a second magnet 180, a board 190, a supporting member 220, a second coil 230, a second position sensor 240, and a circuit board 250 in an accommodating space formed with a base 210.

The cover member 300 may have a form of a box of which a bottom part is open and includes an upper part and side parts. The bottom part of the cover member 300 can be coupled with an upper part of the base 210. The upper part of the cover member 300 may have a shape of a polygon (e.g., a quadrangle or an octagon).

The cover member 300 can include a hollow configured to make a lens (not depicted) coupled with the bobbin 110 to be exposed to external light at the upper part of the cover member. And, the hollow of the cover member 300 can be additionally equipped with a window made of a light penetrating material to inhibit a foreign substance such as dust and moisture from penetrating into the inside of the camera module.

The cover member 300 can be made of non-magnetic material such as SUS or the like to inhibit the cover member from being attached to the first magnet 130. Yet, the cover member can be made of magnetic material to perform a yoke function.

In the following, the bobbin 110 is explained.

The bobbin 110 is disposed in or at an inside of the housing 140 and can move in an optical axis direction or a first direction parallel to the optical axis direction (e.g., Z axis direction) based on an electromagnetic interaction between the first coil 120 and the first magnet 130.

Figure 3A:
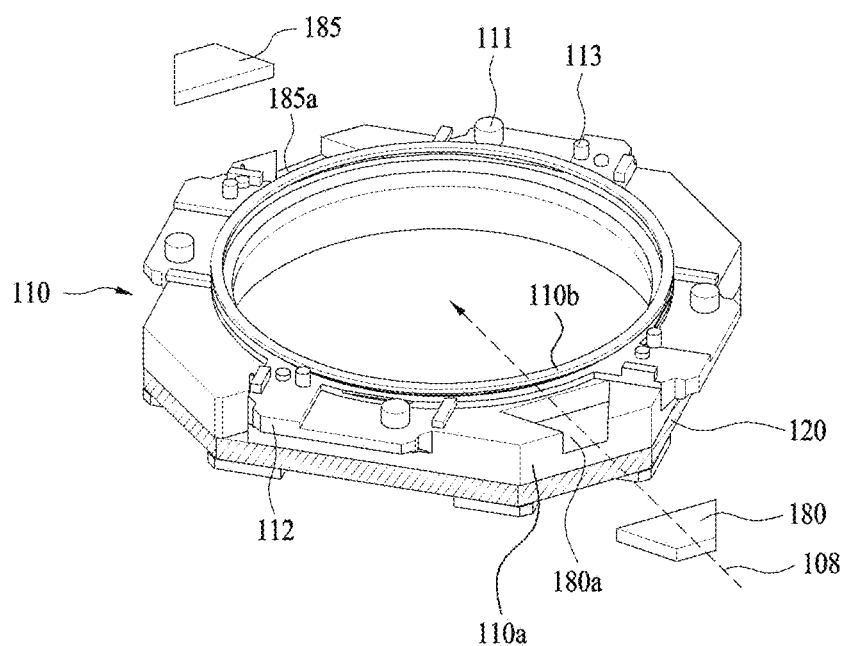
FIG. 3a is a perspective diagram for a bobbin, a first coil, and a second magnet shown in FIG. 1.
Figure 3B:
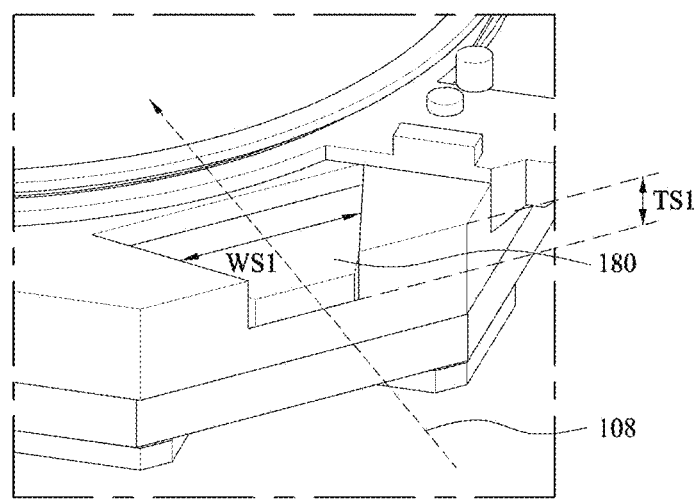
FIG. 3b is a diagram for a second magnet installed in a bobbin.

FIG. 3a is a perspective diagram for a bobbin 110, a first coil 120, and a second magnet 180 shown in FIG. 1 and FIG. 3b is a diagram for a second magnet installed in the bobbin 110.

Referring to FIGS. 3a and 3b, although the bobbin 110 is not depicted, the bobbin can include a lens barrel (not depicted) in which at least one or more lens are installed. The lens barrel can be coupled with the inside of the bobbin 110 in various ways.

The bobbin 110 may have a structure having a hollow for installing a lens or a lens barrel. The hollow may have a circle shape, an oval shape, or a polygon shape, by which the present invention may be non-limited.

The bobbin 110 may have a guide unit 111 configured to guide a position in which the upper elastic member 150 is installed at the upper part of the bobbin. For example, as shown in FIGS. 3A and 3B, the guide unit 111 of the bobbin 110 may protrude from the upper part of the bobbin in a first direction (e.g., Z axis direction) to guide a path through which a frame connection unit 153 of the upper elastic member 150 is passing.

The bobbin 110 can include a protruding unit 112 which is formed by protruding in a second direction and/or a third direction orthogonal to a first direction. An internal frame 151 of the upper elastic member 150 can be mounted on an upper surface 112 of the protruding unit 112 of the bobbin 110.

When the bobbin 110 moves in the first direction or a direction parallel to the first direction to perform an auto focusing function, although the bobbin 110 moves more than a regulated range due to external shock or the like, the protruding unit 111 of the bobbin 110 can inhibit the bobbin 110 from being directly collided with the housing 140.

The bobbin 110 can include an upper side supporting bump 113 coupled/fixed with the upper elastic member 150. For example, the bobbin 110 can include at least one upper side supporting bump 113 protruding from an upper side of the bobbin to be coupled with the internal frame 151 of the upper elastic member 150.

The bobbin 110 can include a bottom side supporting bump (not depicted) coupled/fixed with the lower elastic member 160. For example, the bobbin 110 can include at least one bottom side supporting bump (not depicted) protruding from a bottom side of the bobbin to be coupled with an internal frame 161 of the lower elastic member 160.

And, the bobbin 110 may include a mounting groove for mounting a coil at an outer circumference surface of the bobbin. The first coil 120 can be mounted on the mounting groove.

The bobbin 110 can include a mounting groove 180a for mounting the second magnet at an upper side of the bobbin. The second magnet 180 can be mounted, inserted, fixed, or disposed on the mounting groove. The mounting groove 180a of the bobbin 110 may have an opening exposed to the outer circumference surface of the bobbin 110 in a form that an upper part of the mounting groove is opened.

The mounting groove 180a of the bobbin 110 may have a shape matched with a shape of the second magnet 180. For example, a width (WS1) of the mounting groove 180a may increase in a direction 108 heading towards an inner circumference surface from the outer circumference surface 110a of the bobbin 110. The mounting groove 180a may have a uniform depth (TS1). A bond tank for fixing the second magnet 180 can be arranged at the inside of the mounting groove 180a.

In this case, the depth of the mounting groove 180a of the bobbin 110 may correspond to a distance between an upper surface of the bobbin 110 for which the mounting groove 180a is prepared and a floor of the mounting groove 180a.

The bobbin 110 can include a mounting groove 185a for mounting the third magnet at an upper side of the bobbin. The third magnet 185 can be mounted, inserted, fixed, or disposed in the mounting groove. The mounting groove 185a of the bobbin 110 may have an opening exposed to the outer circumference surface of the bobbin 110 in a form that an upper part of the mounting groove 185a is opened.

The mounting groove 185a for mounting the third magnet may have a shape matched with a shape of the third magnet 185. For example, a width of the mounting groove 185a for mounting the third magnet may increase in a direction heading towards an inner circumference surface 110b from the outer circumference surface 110a of the bobbin 110. The mounting groove 185a of the bobbin 110 may have a uniform depth. A bond tank for fixing the third magnet 185 can be arranged at the inside of the mounting groove 185a for mounting the third magnet.

The mounting groove 185a for mounting the third magnet and the mounting groove 180a for mounting the second magnet can be disposed in a manner of facing each other. For example, a line connecting a center (e.g., a center of a floor of the groove) of the mounting groove 185a for mounting the third magnet with a center (e.g., a center of a floor of the groove) of the mounting groove 180a for mounting the second magnet can be aligned to pass through the center of the bobbin 110. By doing so, the second magnet 180 and the third magnet 185 can be disposed on the bobbin 110 in balance and AF (auto focusing) driving can be precisely performed.

In the following, the first coil 120 is explained.

The first coil 120 is arranged around the outer circumference surface. The first coil 120 can be arranged in a second direction or a third direction perpendicular to a first direction in order not to be overlapped with the second magnet 180.

The first coil 130 can be arranged around the outer circumference surface of the bobbin 110 in the second direction or the third direction in a manner of being separated from the second magnet 180 and the third magnet 185 in order not to be interfered or overlapped with the second magnet 180 and the third magnet 185. For example, the first coil 120 can be disposed at the bottom part of the outer circumference surface of the bobbin 110 and the second and third magnets 180, 185 can be disposed at the outer circumference surface of the bobbin 110, which is located at the upper part of the first coil 120, in a manner of being separated from the first coil 120. The first coil 120 and the second magnet 180 disposed on the bobbin 110 and the first coil 120 and the third magnet 185 can be separated from each other in an optical axis direction or a direction parallel to the optical axis direction.

The first coil 120 may have a shape of a ring winding up the outer circumference surface of the bobbin 110 in a direction rotating on the basis of the optical axis. For example, the first coil 120 can be inserted, disposed, or fixed with a coil mounting groove which is formed on the outer circumference surface of the bobbin 110.

The first coil can directly wind the outer circumference surface of the bobbin 110 up, by which the present invention may be non-limited. According to a different embodiment, the first coil 120 may wind the bobbin 110 up using a coil ring. Or, the first coil can be configured by a coil block having an angulated ring shape.

If a driving signal (e.g., driving current) is supplied to the first coil 120, the first coil can generate electromagnetic force with the first magnet 130 via electromagnetic interaction. The bobbin 110 can move in a first direction or a direction parallel to the first direction due to the generated electromagnetic force.

The first coil 120 and the first magnet 130 disposed on the housing 140 can be arranged in a manner of facing each other or being aligned. If the first magnet 130 is configured by a unibody, an entire surface of the first magnet facing the first coil 120 can be arranged to have the same polarity.

If the first magnet 130 is divided by 2 or 4 on the basis of a surface perpendicular to an optical axis and a surface of the first magnet 130 facing the first coil 120 is divided by two or more surfaces, the first coil 120 can also be divided by a number corresponding to the number of divided first magnet 130.

In the following, the housing 140 is explained.

The housing 140 supports the first magnet 130 for driving and the first position sensor 170.

In order to move the bobbin 110 in a first direction parallel to an optical axis using electromagnetic force generated by electromagnetic interaction between the first coil 120 and the first magnet 130, the bobbin 110 can be accommodated at the inside of the housing.

The housing 140 may have a shape of a hollow pillar. For example, the housing 140 may include a hollow of a polygon (e.g., a quadrangle, or an octagon) or a hollow of a circle form.

Figure 4:
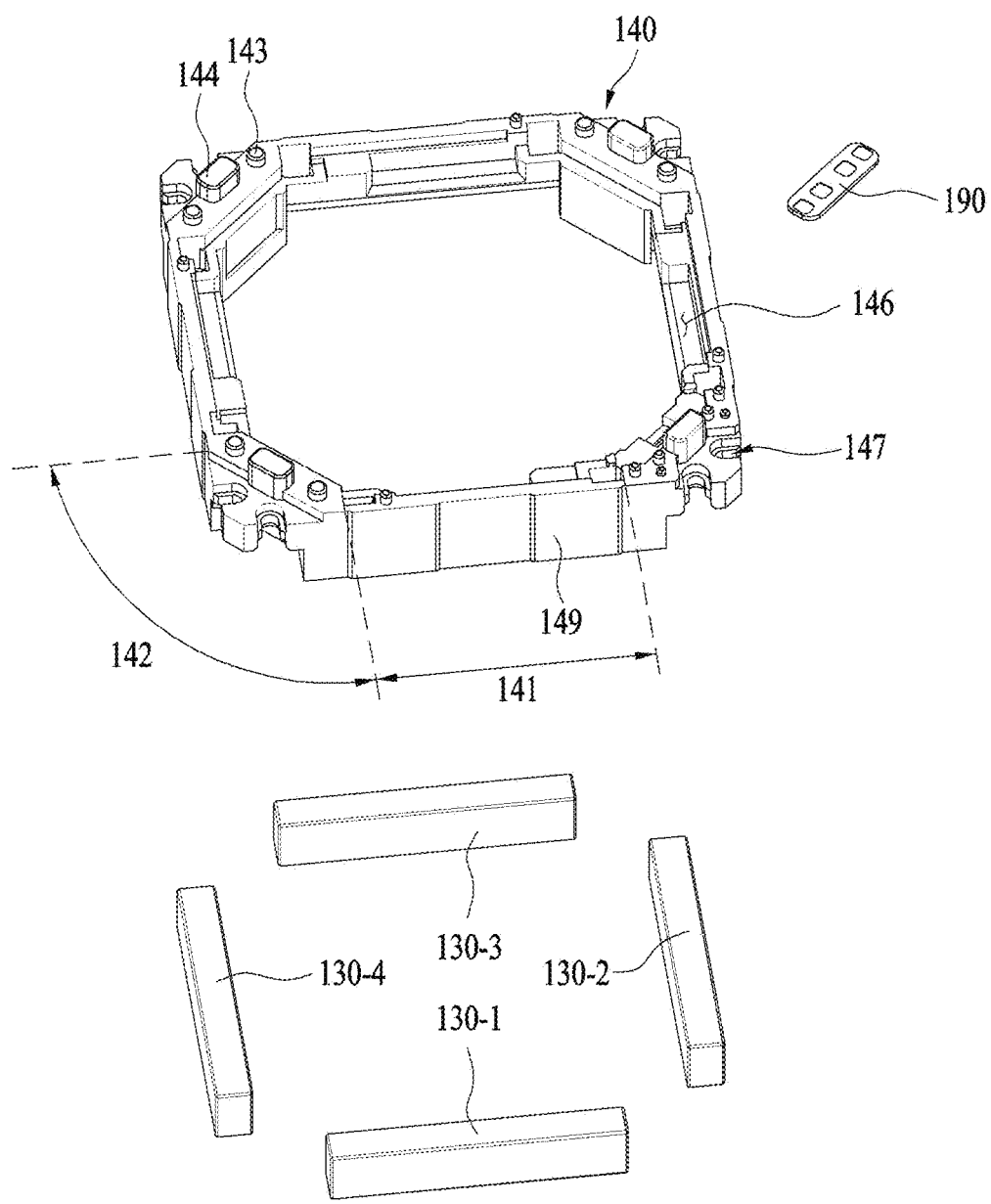
FIG. 4 is a first perspective diagram for a housing, a first position sensor, a board, and a first magnet shown in FIG. 1.
Figure 5:
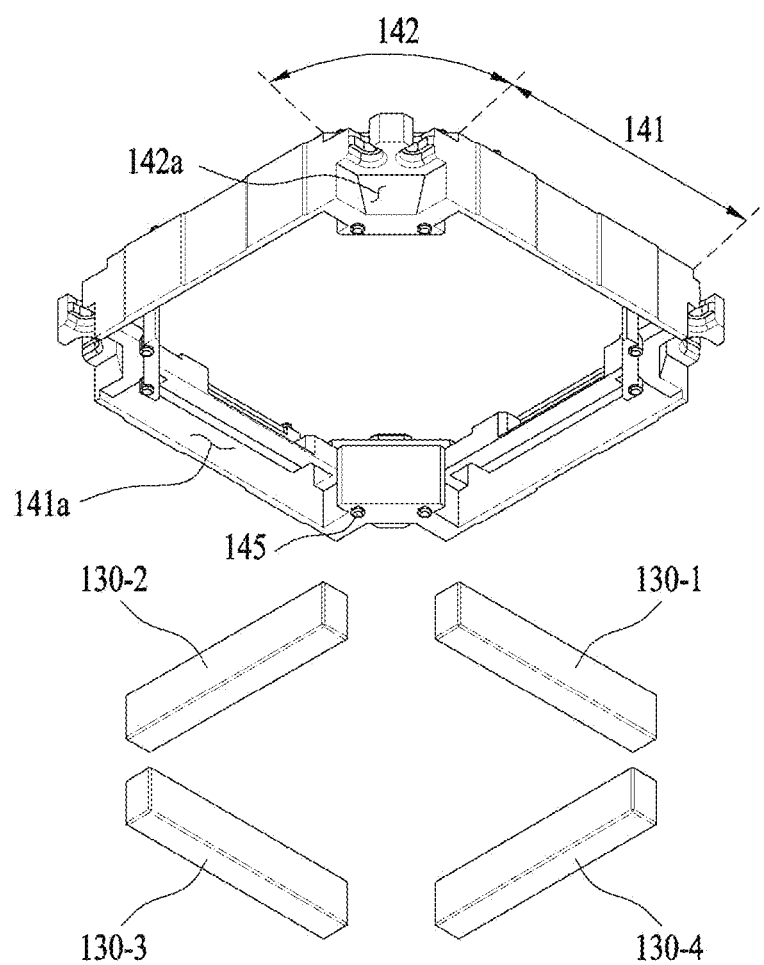
FIG. 5 is a second perspective diagram for a housing, a first magnet, a first position sensor, and a board shown in FIG. 1.
Figure 6:
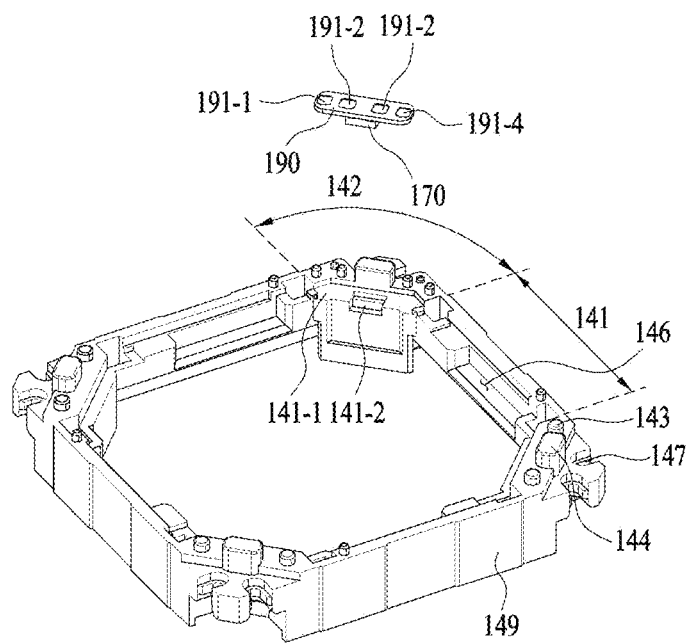
FIG. 6 illustrates installation grooves arranged at a housing to install a first position sensor and a board in the housing.
Figure 7:
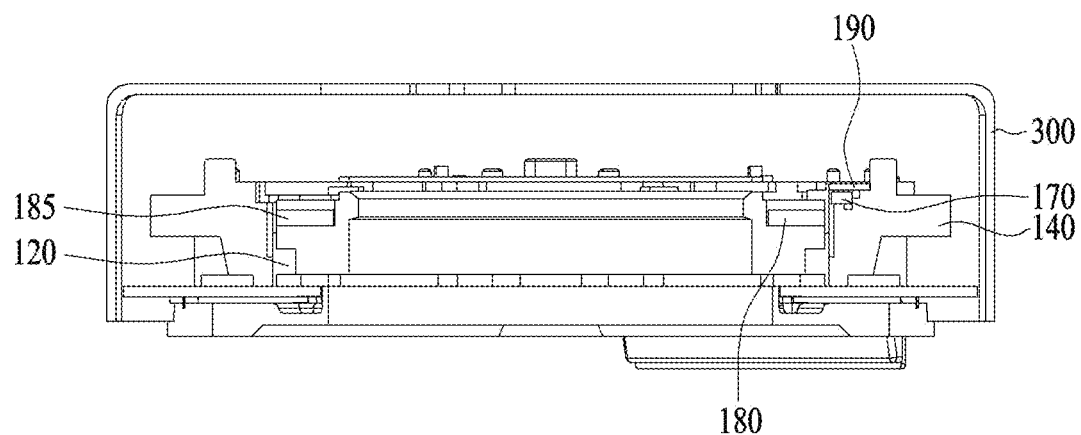
FIG. 7 is a cross-sectional diagram for a lens driving device cut according to I-I' line shown in FIG. 2.

FIG. 4 is a first perspective diagram for a housing 140, a first position sensor 170, a board 190, and a first magnet 130 shown in FIG. 1, FIG. 5 is a second perspective diagram for a housing 140, a first magnet 130, a first position sensor 170, and a board 190 shown in FIG. 1, FIG. 6 illustrates installation grooves 141-1, 141-2 arranged at a housing 140 to install a first position sensor 170 and a board 190 in the housing, and FIG. 7 is a cross-sectional diagram for a lens driving device cut according to I-I' line shown in FIG. 2.

Referring to FIGS. 4 to 7, when the bobbin 110 moves in an optical axis direction or a direction parallel to the optical axis direction, the housing 140 can include a mounding groove 146 installed in a positon corresponding to a protruding unit 112 of the bobbin 110 to avoid interference with the protruding unit 112 of the bobbin 110.

The housing 140 can include a plurality of sides 141, 142. For example, the housing can include 4 first sides 141 and 4 second sides 142. A width of each of the first sides 141 can be longer than a width of each of the second sides 142.

The first sides 141 of the housing may correspond to a part in which the first magnet 130 is installed. The second sides of the housing 140 can be positioned between 2 first sides adjacent to each other and may correspond to a part at which the supporting member 220 is disposed. The first sides of the housing 140 connect the second sides 142 of the housing 140 with each other and can include a plane of a prescribed depth. Each of the first sides 141 of the housing 140 may have an area identical to or greater than an area of the first magnet 130.

The housing 140 can include a first magnet mounting unit 141a for accommodating the first magnet 130, a board mounting groove 141-1 for accommodating the board 190, and a first position sensor mounting groove 141-2 for accommodating the first sensor 170.

The first magnet mounting unit 141a can be prepared at the internal bottom of at least one of the first sides 141 of the housing 140. For example, the first magnet mounting unit 141a can be prepared at the internal bottom of each of the 4 first sides and each of the first magnets 130 can be inserted or fixed with one of the first magnet mounting units 141a.

The first magnet mounting unit 141a of the housing 140 can be formed by a groove corresponding to a size of the first magnet 130. An opening can be formed at a floor of the first magnet mounting unit 141a of the housing 140 facing the second coil 240. A floor of the first magnet 130 fixed with the first magnet mounting unit 141a can face the second coil 230.

The board mounting groove 141-1 can be prepared at an upper part or the top of one of the second sides 142 of the housing 140. In order to easily install the board 190, the board mounting groove 141-1 may have a groove form that an upper part of the board mounting groove is opened. The board mounting groove 141-1 has a side and a floor and may have an opening opened to the inside of the housing 140. The floor of the board mounting groove 141-1 may have a shape corresponding to or matched with a shape of the board 110.

The first position sensor mounting groove 141-2 can be prepared at the floor of the board mounting groove 141-1. The first position sensor mounting groove 141-2 may have a structure sank from the floor of the board mounting groove 141-1. For example, the first position sensor mounting groove 141-2 can be configured to be contacted with the floor of the board mounting groove 141-1 and an internal side of the second side.

In order to easily install the first position sensor 170, the first position sensor mounting groove 141-2 may have a groove form that an upper part of the first position sensor mounting groove is opened. The first position sensor mounting groove 141-2 has a side and a floor and may have an opening opened to the inside of the housing 140. The first position sensor mounting groove 141-2 may have a shape corresponding to or matched with a shape of the first position sensor 170.

The first magnet 130 and the board 190 can be fixed with the first magnet mounting unit 141a and the first position sensor mounting groove 141-2, respectively, using adhesive, by which the present invention may be non-limited. The first magnet 130 and the board 190 can be fixed with the first magnet mounting unit 141a and the first position sensor mounting groove 141-2, respectively, using an adhesive member such as a double-sided tape and the like.

The first side 141 of the housing 140 can be disposed in a manner of being parallel to a side board of the cover member 300. And, an area of the first side 141 of the housing 140 may be greater than an area of the second side 142. The second side 142 of the housing 140 can be equipped with a hole 147 that forms a path through which the supporting member 220 is passing. For example, the housing 140 can include holes 147 that penetrate an upper part of the second side 142. The number of holes 147 can be identical to the number of supporting members. The supporting member 220 penetrates the hole 147 and can be connected with the upper elastic member 150.

And, in order to inhibit the housing from being directly collided with the inside of the cover member 300 shown in FIG. 1, a stopper 144 can be prepared at an upper part of the housing 140.

The housing 140 can include at least one or more upper side supporting bumps 143 coupled with an external frame 152 of the upper elastic member 150 at an upper side of the housing.

For example, the upper side supporting bumps 143 of the housing 140 can be formed at an upper part of at least one of the first side 141 and the second side 142 of the housing 140. The housing 140 can lower side supporting bumps 145 coupled with an external frame 162 of the lower elastic member 160 at a lower side of the housing.

In order to form a path through which the supporting member 220 is passing and secure a space with which silicon of a gel form playing a role of a damper is filled, the housing 140 can include a groove 142a formed at the second side 142. In particular, the groove 142a of the housing 140 can be filled with damping silicon.

The housing 140 can include at least one or more stoppers 149 protruded from the first sides 141. When the housing 140 moves in a second direction and/or a third direction, the stoppers 149 can protrude from the first sides 141 in the second direction or the third direction to inhibit the housing from being collided with the inside of the side board of the cover member 300.

In order to inhibit a floor of the housing 140 from being collided with a base 210 and/or a circuit board 250, the housing can further include a stopper (not depicted) protruded from a bottom side of the housing. The housing 140 can be respectively separated from the base 210 and the cover member 300 with the help of the stoppers formed at the upper side and the bottom side of the housing 140. In particular, it is able to maintain an optical axis direction height without any interference at the upper side and the bottom side of the housing 140. Hence, the housing can perform a shifting operation for inhibiting, a hand tremor in the second direction and the third direction in a plane perpendicular to the optical axis.

In the following, the first magnet 130 is explained.

The first magnet 130 can be disposed on the housing 140 to make a part of the first magnet to be overlapped with the first coil 120 in a direction perpendicular to the optical axis. For example, the first magnet 130 can be inserted into or disposed in the inside of the mounting unit 141a of the housing 140.

According to a different embodiment, the first magnet 130 can be disposed on the outside or the inside of the first side 141 of the housing 140 or can be disposed on the outside or the inside of the second side 142 of the housing 140.

A shape of the first magnet 130 corresponds to a shape corresponding to the first side 141 of the housing 140. In particular, the shape of the first magnet may have a shape of a rectangular, by which the present invention may be non-limited. A surface of the first magnet facing the first coil 120 can be configured to correspond to or be matched with a curvature of a corresponding surface of the first coil 120.

The first magnet 130 can be configured by a unibody. A surface of the first magnet facing the first coil 120 and an opposite side surface can be configured by the S pole and the N pole, respectively, by which the present invention may be non-limited. An opposite case is also available.

At least two or more first magnets can be installed in the housing and each of the first magnets can be configured to face each other. For example, two pairs of the first magnets 130 facing each other can be disposed on the housing 140. In this case, a plane of the first magnet 130 may have a form of a quadrangle. Unlikely, the plane of the first magnet may have a shape of a triangle or a diamond.

The first magnet 130 can be disposed on each of 2 first sides facing each other among the first sides 141 of the housing 140.

In the following, the upper elastic member 150, the lower elastic member 160, and the supporting member 220 are explained.

The upper elastic member 150 and the lower elastic member 160 support the bobbin 110 using elasticity. The upper elastic member 150 is connected with an upper part of the bobbin 110 and an upper part of the housing 140 to support the upper part of the bobbin 110 and the upper part of the housing 140. The lower elastic member 150 is connected with a lower part of the bobbin 110 and a lower part of the housing 140 to support the lower part of the bobbin 110 and the lower part of the housing 140.

The supporting member 220 can support the housing 140 to make the housing move in a direction perpendicular to an optical axis for the base 210 and can electronically connect at least one of the upper elastic member 150 and the lower elastic member 160 with a circuit board 250.

Figure 8:
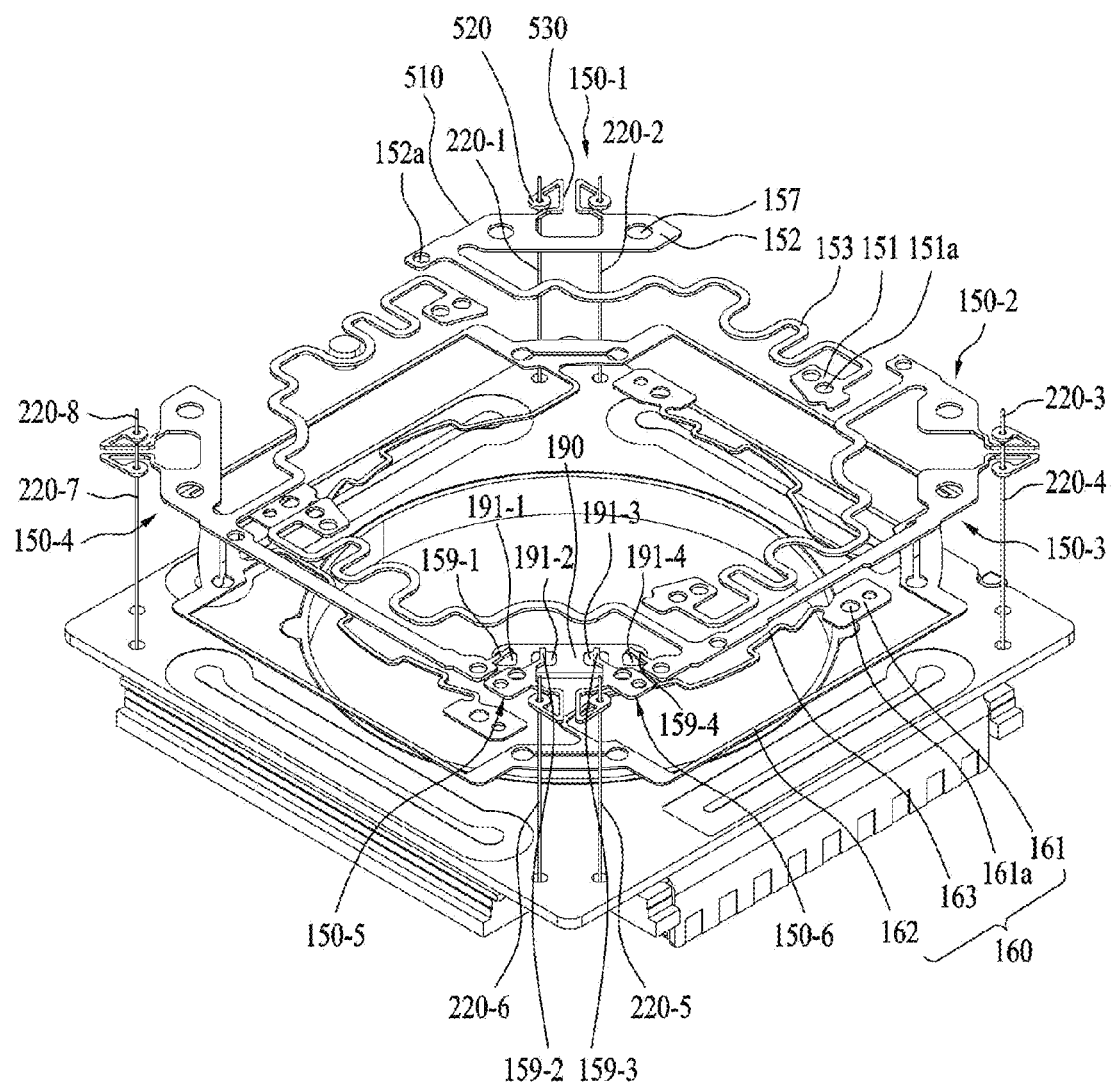
FIG. 8 is a perspective diagram for an upper elastic member, a lower elastic member, a first position sensor, a board, a base, a supporting member, and a circuit board shown in FIG. 1.

FIG. 8 is a perspective diagram for an upper elastic member 150, a lower elastic member 160, a first position sensor 170, a board 190, a base 210, a supporting member 220, and a circuit board 250 shown in FIG. 1.

Referring to FIG. 8, the upper elastic member 150 can be divided into two or more parts. For example, the upper elastic member 150 can be electronically divided into a plurality of upper elastic members 150-1 to 150-6 separated from each other.

Pads 191-1 to 191-4 of the board 190 can be electronically connected with one selected from among a plurality of the upper elastic members 150-1 to 150-6.

Although the present invention is explained with an example that the pads 191-1 to 191-4 of the board 190 are electronically connected with one selected from among a plurality of the upper elastic members 150-1 to 150-6, the present invention is not restricted to the example.

According to a different embodiment, the pads 191-1 to 191-4 of the board 190 can be electronically connected with the lower elastic member 160 or can be electronically connected with both the upper elastic member 150 and the lower elastic member 160.

Each of the pads 191-1 to 191-4 of the board 190 electronically connected with the first position sensor 170 can be electronically connected with one selected from among a plurality of the upper elastic members 150-1 to 150-6.

At least one of a plurality of the upper elastic members 150-1 to 150-6 can be electronically connected with one selected from among supporting members 220.

Each of the first to fourth upper elastic members 150-1 to 150-4 can include an internal frame 151 connected with the bobbin 110, an external frame 152 connected with the housing 140, and a frame connection unit 153 configured to connect the internal frame 151 with the external frame 152.

For example, the internal frame 151 can include a hole 151a coupled with an upper side supporting bump 113 of the bobbin 110 and the external frame 152 can include a hole 152a coupled with an upper side supporting bump 143 of the housing 140.

Internal frames of two upper elastic members selected from among the first to fourth upper elastic members 150-1 to 150-4 can be electronically connected with both ends of the first coil 120.

An external frame 152 of each of the first to fourth upper elastic members 150-1 to 150-4 can be connected with at least one of supporting members.

For example, an external frame 152 of each of the first upper elastic member and the fourth upper elastic member 150-1, 150-4 can be connected with two supporting members (220-1 and 220-2, 220-7 and 220-8). An external frame of each of the second upper elastic member and the third upper elastic member 150-2, 150-3 can be connected with one supporting member (220-3 and 220-4).

The frame connection unit 153 can form a pattern of a prescribed shape in a manner of being bent at least one time. An ascending operation and/or a descending operation of the bobbin 110 moving in a first direction parallel to an optical axis can be elastically supported via a position change and a micro deformation of the frame connection unit 153.

Each of the fifth and the sixth upper elastic members 150-5, 150-6 is coupled with the housing 140 and is connected with one selected from among supporting members 220-1 to 220-8.

For example, each of the fifth and the sixth upper elastic members 150-5, 150-6 can include an external frame coupled with the housing 140.

The fifth and the sixth upper elastic members 150-5, 150-6 can be coupled with the housing 140 only without being coupled with the bobbin 110 and can elastically support the housing 140. In particular, the fifth and the sixth upper elastic members 150-5, 150-6 are separated from the bobbin 110 and may not be contacted with the bobbin 110.

The external frame of each of the fifth and the sixth upper elastic members 150-5, 150-6 can be connected or coupled with one end of the supporting members 220-5, 220-6 and another end of the supporting members 220-5, 220-6 can be electronically connected with the circuit board 250 through a hole 230a prepared at a circuit member 231.

An external frame 152 of each of the first to the sixth elastic members 150-1 to 150-6 can include a first coupling unit 510 coupled with the housing 140, a second coupling unit 520 coupled with a supporting member (e.g., 220-1), and a connection unit 530 configured to connect the first coupling unit 510 with the second coupling unit 520.

The supporting members 220-1 to 220-8 can be electronically connected with the second coupling unit 520 of the external frame 152 using soldering or a conductive adhesive member (e.g., conductive epoxy). The connection unit 530 may have a form of being bent at least one time. Since a width of the connection unit 530 is narrower than a width of the frame connection unit 153 of the upper elastic member 150, the connection unit 530 can easily move in an optical axis direction or a first direction. As a result, it is able to distribute stress applied to the upper elastic member 150 and stress applied to the supporting member 220.

The external frame 152 of at least one selected from among the first to the sixth upper elastic members 150-1 to 150-6 can include contacting units 159-1 to 159-4 contacted or connected with at least one selected from among pads 191-1 to 191-4 of the board 190.

For example, an external frame of each of the third to the sixth upper elastic members 150-3 to 150-6 adjacent to a second sidewall 142 of the housing 140 to which the board 190 is disposed can include contacting units 159-1 to 159-4 contacted or connected with at least one selected from among the pads 191-1 to 191-4 of the board 190.

The contacting units 159-1 to 159-4 of each of the third to the sixth upper elastic members 150-3 to 150-6 can be directly contacted with the pads of the board 190 in a manner of being extended from one end of the external frame.

The lower elastic member 160 can include an internal frame 161 coupled with a lower side supporting bump of the bobbin 110, an external frame 162 coupled with a lower side supporting bump of the housing 140, and a connecting unit 163 configured to connect the internal frame 161 with the external frame.

In FIG. 8, although the lower elastic member 160 is not divided, according to a different embodiment, the lower elastic member 160 can be divided into two or more elastic members.

In the following, the supporting member 220 is explained.

The supporting member 220 can be disposed on each of second sides 142. For example, two supporting members can be disposed on each of 4 second sides 142.

Or, according to a different embodiment, only one supporting member is disposed on each of 2 second sides 142 among 4 second sides 142 in the housing 140 and 2 supporting members can be disposed on each of the remaining 2 second sides 142.

According to a further different embodiment, the supporting member 220 can be disposed on a first side 141 of the housing 140 in a form of a leaf spring.

As mentioned in the foregoing description, the supporting member 220 can form a path through which power required by the first position sensor 170 and the first coil 120 is delivered. The supporting member 220 can form a path for providing an output signal outputted from the first position sensor 170 to the circuit board 250.

For example, the first coil 120 can be electronically connected with the circuit board 250 through the upper elastic member 150 and the supporting member 220 and can receive power or a driving signal from the circuit board 250.

The supporting member 220 can be implemented by a member supported by elasticity (e.g., a leaf spring, a coil spring, a suspension wire, etc.). According to a different embodiment, the supporting member 220 and the upper elastic member can be configured as a unibody.

The supporting members 220-1 to 220-8 can be separated from the housing 140. The supporting members can be directly connected with the connection unit 530 of the external frame 153 of the upper elastic member 150 instead of being fixed with the housing 140.

Since the connection unit 530 of the external frame 153 of the upper elastic member 150 is separated from the housing 140, the connection unit 530 can easily move in an optical axis direction or a first direction parallel to the optical axis direction. According to an embodiment, since the supporting members 220-1 to 220-8 are directly connected with the connection unit 530 capable of easily moving in the first direction, the supporting members can more easily move in the optical axis direction or the first direction parallel to the optical axis direction compared to a general supporting member fixed with the housing 140. As a result, it is able to enhance accuracy of image stabilization. In particular, since it is able to distribute stress in response to a drop and shock, it is able to reduce deformation and disconnection of the supporting members 220-1 to 220-8.

The first to the sixth upper elastic members 150-1 to 150-6 can be electronically connected with the circuit board 250 through the supporting members 220-1 to 220-8.

In order to absorb and buffer vibration of the bobbin 110, the lens driving device 100 can further include a first damping member (not depicted) disposed between each of the upper elastic members 150-1 to 150-6 and the housing 140.

And, for example, the lens driving device 100 can further include a second damping member (not depicted) disposed between the second frame connection unit 163 of the lower elastic member 160 and the housing 140.

And, for example, a damping member (not depicted) can be further disposed between an internal side of the housing 140 and the outer circumference surface of the bobbin 110.

And, for example, in order to absorb and buffer vibration of the housing 140, a damping member can be disposed between one end of the supporting members 220-1 to 220-8 and the upper elastic member 150 and/or between another end of the supporting members 220-1 to 220-8 and the circuit board 250.

In the following, the first position sensor 170 and the board 190 are explained.

The first position sensor 170 is installed in the board 190 arranged at the housing 140 and can move together with the housing 140 when image stabilization is performed.

If the bobbin 110 moves, the first position sensor 170 can sense strength of a magnetic field of the second magnet 180 installed in the bobbin 110 and can output an output signal according to a sensed result.

The first position sensor 170 can be disposed on a lower side of the board 190. In this case, the lower side of the board 190 may correspond to a side heading towards an upper side of the housing when the board 190 is installed in the housing 140.

The first position sensor 170 can be implemented in a driver form including a hall sensor. Or, the first position sensor can be solely implemented by a location detection sensor such as a hall sensor, or the like.

The first position sensor 170 can include 2 input terminals and 2 output terminals and the input terminals and the output terminals of the first position sensor 170 can be electronically connected with one selected from among pads 190-1 to 190-4 of the board 190.

The board 190 can include the pads 190-1 to 190-4 installed in an upper side of the board and a circuit pattern or a wire (not depicted) configured to connect the first position sensor 170 installed in a lower side with the pads. For example, the board 190 may correspond to a printed circuit board or a FPCB.

According to a different embodiment, the first position sensor 170 is disposed on the upper side of the board 190 and the pads 190-1 to 190-4 can be disposed on the lower side of the board 190, by which the present invention may be non-limited.

Since the pads 190-1 to 190-4 of the board 190 are electronically connected with the circuit board 250 through the third to the sixth upper elastic members 150-3 to 150-6 and the supporting members 220-4 to 220-8, the first position sensor 170 can be electronically connected with the circuit board 250.

Both ends of the first coil 120 can be connected with the internal frames of the first and the second upper elastic members 150-1, 150-2 and can be electronically connected with the circuit board 250 through the first and the second upper elastic members 150-1 to 150-2 and the supporting members 220-1 to 220-3.

In the following, the base 210, the circuit board 250, and the second coil 230 are explained.

The base 210 can include a hollow corresponding to a hollow of the bobbin 110 and/or a hollow of the housing 140 and may have a shape corresponding to a shape of the cover member 300 or a shape matched with the shape of the cover member 300. For example, the shape of the base may correspond to a shape of a quadrangle.

Figure 9:
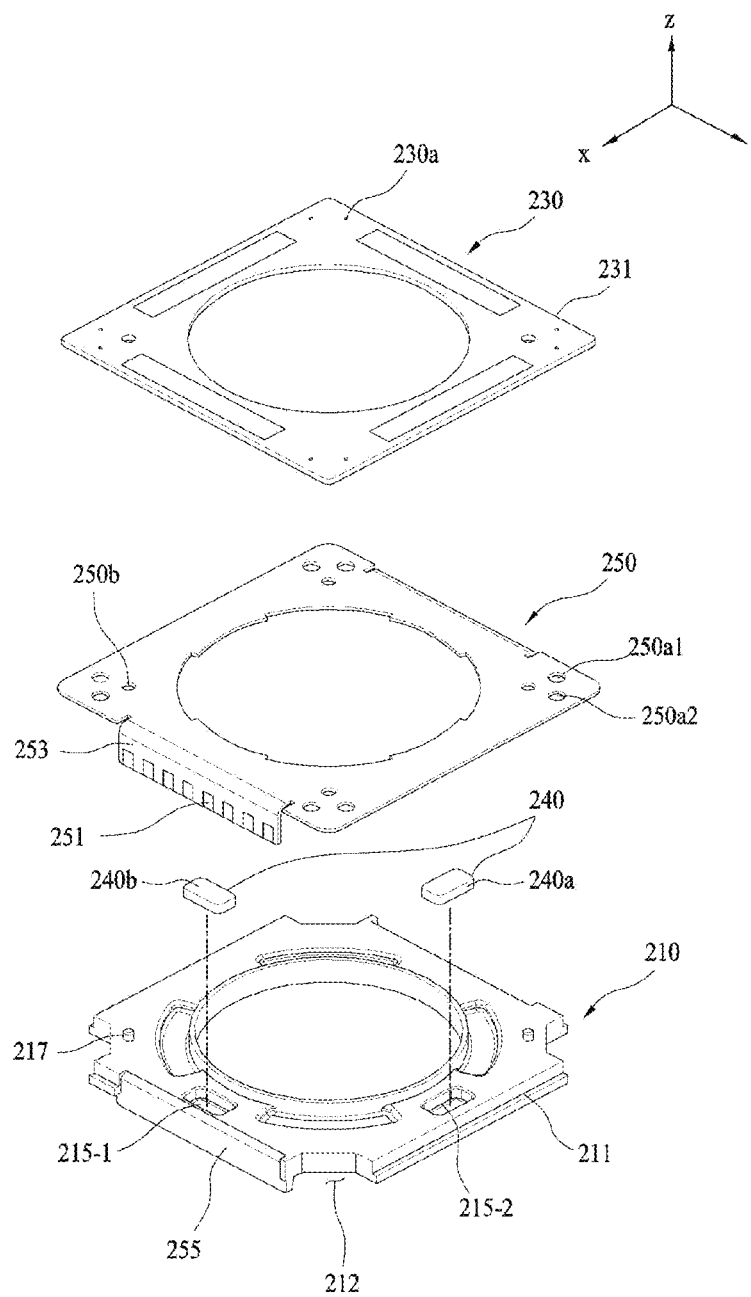
FIG. 9 is a perspective diagram for a base, a second coil, and a circuit board shown in FIG. 1.

FIG. 9 is a perspective diagram for a base 210, a second coil 230, and a circuit board 250 shown in FIG. 1.

Referring to FIG. 9, the base 210 can include a sill 211 to which adhesive is applicable to fix the cover member 300 with the base 210 using the adhesive. In this case, the sill 211 can guide the cover member 300 to be coupled with the upper part and an end part of the cover member 300 can be coupled with a surface of the base.

A supporting unit 255 of a corresponding size can be formed at a surface of the base 210 that faces a part at which a terminal 251 of the circuit board 250 is formed. The supporting unit 255 of the base 210 is formed by a prescribed section from an outer surface of the base 210 without a sill and can support a terminal side 253 of the circuit board 250.

An edge of the base 210 can include a groove 212. If an edge of the cover member 300 has a protruded shape, the protruding part of the cover member 300 can be coupled with the base 210 in the groove 212.

An upper part of the base 210 can include mounting grooves 215-1, 215-2 to which a second position sensor 240 is disposed. According to an embodiment, if the base 210 includes 2 mounting grooves 215-1, 215-2 and the second position sensor 240 is disposed in the mounting grooves 215-1, 215-2 of the base 210, the second position sensor can sense the extent of movement of the housing 140 that moves in a second direction and a third direction. To this end, virtual lines connecting the centers of the mounting grooves 215-1, 215-2 of the base 210 with the center of the base 210 can be crossed. For example, an angle formed by the virtual lines connecting the centers of the mounting grooves 215-1, 215-2 of the base 210 with the center of the base 210 may correspond to 90 degrees, by which the present invention may be non-limited.

A second coil 230 can be disposed on an upper part of the circuit board 250 and the second position sensor 240 can be disposed on a lower part of the circuit board 250. The second position sensor 240 can sense displacement of the housing 140 for the base 210 in a direction (e.g., X axis or Y axis) perpendicular to an optical axis (e.g., Z axis).

In order to sense the displacement of the housing 140 in the direction perpendicular to the optical axis, the second position sensor 240 can include 2 sensors 240a, 240b which are arranged to be orthogonal to each other.

The circuit board 250 can be disposed on an upper part of the base 210 and can include a hollow corresponding to a hollow of the bobbin 110, a hollow of the housing 140, and/or a hollow of the base 210. A shape of an outer circumference surface of the circuit board 250 may have a shape corresponding to a shape of the upper part of the base or a shape matched with the shape of the upper part of the base 210. For example, the shape of the outer circumference surface of the circuit board 250 may correspond to a shape of a rectangular.

The circuit board 250 can include at least one terminal side 253 at which a plurality of terminals 251 or pins are formed. The terminal side 253 is bent from the upper part of the circuit board and electronical signals are provided to a plurality of the terminals from the external.

In FIG. 9, although the second coil 230 is implemented in a manner of being prepared at a circuit member 231 separated from the circuit board 250, by which the present invention may be non-limited. According to a different embodiment, the second coil 230 can be implemented in such a form as a coil block having a ring shape, an FP coil, or a circuit pattern formed at the circuit board 250.

The second coil 230 can include holes 230a penetrating the circuit member 231. The supporting member 220 can be electronically connected with the circuit board 250 by penetrating the holes 230a.

The second coil 230 is disposed on the upper part of the circuit board 250 to make the second coil face the first magnet 130 which is disposed on the housing 140. The second coil can be electronically connected with the circuit board 250 and can receive power or a driving signal from the circuit board 250.

Total 4 second coils 230 can be installed in 4 sides of the circuit board 250, by which the present invention may be non-limited. For example, 1 second coil for second direction and 1 second coil for third direction can be installed only. Or, it may install at least 4 or more second coils.

As mentioned in the foregoing description, if the first magnet 130 and the second coil 230 are disposed to face each other, the housing 140 moves in the second direction and/or the third direction due to the interaction between the first magnet 130 and the second coil 230 and image stabilization can be performed.

The second position senor 240 can be implemented using a hall senor. If a certain sensor is able to sense strength of a magnetic field, the sensor can be used as the second position sensor. For example, the second position sensor 240 can be implemented in a driver form including a hall sensor. Or, the second position sensor can be solely implemented by a location detection sensor such as a hall sensor, or the like.

A plurality of terminals 251 can be installed in a terminal side 253 of the circuit board 250. For example, it is able to supply power to the first coil 120, the second coil 230, the first position sensor 170, and the second position sensor 240 by receiving power through a plurality of the terminals 251 installed in the terminal side 253 of the circuit board 250. And, it is able to send output signals outputted from the first position sensor 170 and the second position sensor 240 to the external.

According to an embodiment, the circuit board 250 can be implemented by an FPCB, by which the present invention may be non-limited. Terminals of the circuit board 250 can be directly formed on a surface of the base 210 using a surface electrode scheme or the like.

The circuit board 250 can include holes 250a1, 250a2 capable of being penetrated by the supporting member 220. The supporting member 220 can be electronically connected with a corresponding circuit pattern capable of being disposed at a lower surface of the circuit board 250 through the holes 250a1, 25012 of the circuit board 250 via soldering, and the like.

According to a different embodiment, the circuit board 250 may not include the holes 250a1, 25012. The supporting member 220 can be electronically connected with a circuit pattern formed on an upper surface of the circuit board 250 via soldering, and the like.

The circuit board 250 can further include a hole 250b coupled with an upper supporting bump 217 of the base 210. As shown in FIG. 8, the upper supporting bump 217 of the base 210 is coupled with the hole 250b using heat welding or adhesive member such as epoxy and the like.

Figure 10A:
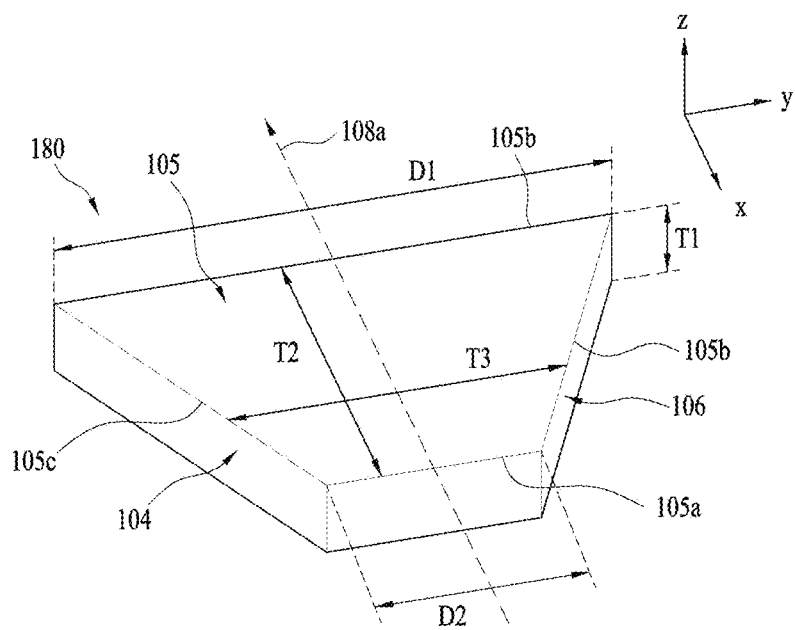
FIGS. 10a to 10e illustrate a second magnet according to embodiments.

FIG. 10a illustrates a second magnet 180 according to an embodiment.

Referring to FIG. 10a, a second magnet 180 can include a lower side 104, an upper side 105, and a side 106. The lower side 106 of the second magnet 180 corresponds to a side contacted with a floor of the mounting groove 180a for mounting the second magnet. The upper side 104 of the second magnet 180 corresponds to a side facing the lower side 106 and can be exposed from the mounting groove 180a for mounting the second magnet. For example, the lower side 104 and the upper side 105 may have the same shape.

A boundary between N pole and S pole of the second magnet 180 can be parallel to the upper side 105, by which the present invention may be non-limited. For example, the boundary between N pole and S pole of the second magnet 180 can be positioned to be parallel to the upper side. The upper side and the lower side may correspond to the S pole and the N pole, respectively. The polarity can be disposed in an opposite way.

The second magnet 180 may have a shape of a polyhedron (e.g., hexahedron) of which a first length (T1) is shorter than a distance (T2, T3) between sides facing each other of the upper side 105.

The first length (T1) may correspond to a height of the side 106 of the second magnet 180 or a distance between the upper side 105 and the lower side 106. Or, the first length (T1) may correspond to a length of the second magnet 180 in an optical axis direction or a first direction (e.g., Z axis direction) parallel to the optical axis.

For example, the second magnet 180 may have a shape of a polyhedron (e.g., hexahedron) of which a first length (T1) is shorter than a second length (T2) and a third length (T3).

For example, the first length (T1) can be uniform for the entire region of the second magnet 180.

The second length (T2) may correspond to a distance between 2 sides 105a, 105b facing each other of the upper side or a length in a second direction (e.g., X axis direction) perpendicular to the optical axis.

The third length (T3) may correspond to a distance between 2 sides 105c, 105d facing each other of the upper side or a length in a third direction (e.g., Y axis direction) perpendicular to the optical axis.

If the number of sides of the upper side of the second magnet 180 exceeds 4, the first length (T1) can be shorter than a distance between sides facing each other.

Since the first length (T1) is shorter than the second length and the third length (T1<T2, T1<T3), it may be able to increase a separation distance in the first direction between the second magnet 180 and the first magnet 130.

Figure 11:
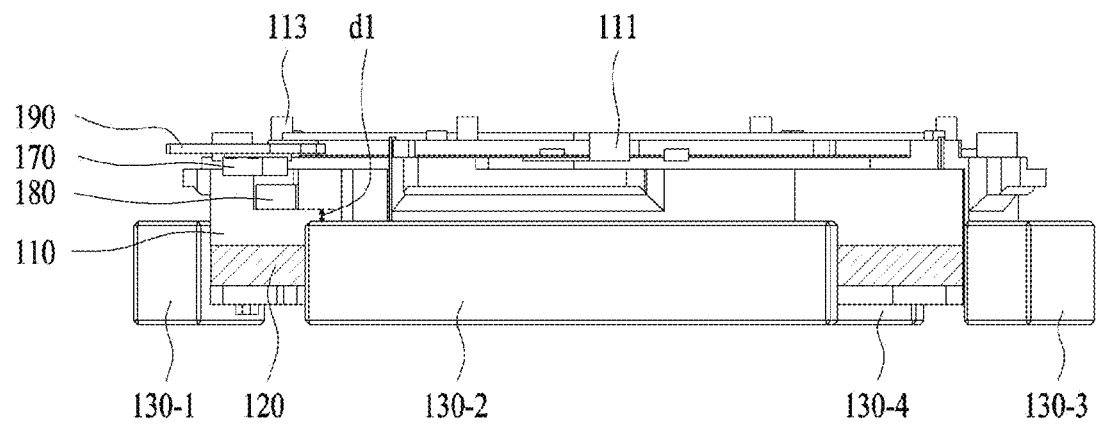
FIG. 11 illustrates a distance between a first magnet and a second magnet separated from each other.

FIG. 11 illustrates a separation distance between the first magnet 130 and the second magnet 180 at an initial position.

Referring to FIG. 11, a separation distance (d1) in a first direction may correspond to a distance between a virtual line positioned at a plane identical to a lower side of a second magnet 180 and an upper side of the first magnet (e.g., 130-1 to 130-4) at an initial position of a driving unit (e.g., bobbin 110). In this case, the initial position may correspond to an initial position of the driving unit (e.g., bobbin 110) in a state that power is not applied to the first coil 120 or a position at which the driving unit is positioned according to the elastically deformed upper and lower elastic members 150, 160 due to the weight of the driving unit only. The driving unit can include the bobbin 110 and configurations installed in the bobbin 110 (e.g., the first coil 120, the second magnet 180, and the third magnet 185).

If a magnet for sensing and a magnet for driving are disposed in a manner of being overlapped with each other in a direction perpendicular to an optical axis, an output of the first position sensor 170 can be influenced by interference between the magnet for driving and the magnet for sensing. As a result, it is unable to precisely perform AF driving.

If a separation distance between the magnet for sensing and the magnet for driving is short in an optical axis direction or a direction parallel to the optical axis direction, interference between the magnet for sensing and the magnet for driving may considerably influence on an output of the first position sensor 170 due to the movement of the magnet for sensing according to the movement of the bobbin moving up and down. As a result, it is unable to precisely perform AF driving. Since a height of an application (e.g., a smartphone or a camera module) in which a lens driving device is installed is getting lower, the short separation distance between the magnet for sensing and the magnet for driving may become a constraint for implementing a precise AF driving.

According to an embodiment, each of the second magnet 180 and the third magnet 185 is not overlapped with the first magnet 130 in a direction perpendicular to the optical axis at the initial position of the bobbin.

According to an embodiment, if a shape of the second magnet 180 (a shape shown in FIGS. 10*a* to 10*e*) is implemented to increase a separation distance (d1) between the second magnet 180 and the first magnet 130 in a first direction, it is able to suppress interference between the first magnet 130 and the second magnet 180. By doing so, it is able to make a height of an application to be lowered and perform precise AF driving.

In this case, if a first length (T1) of the second magnet 180 is decreased, a range of an output signal of the first position sensor 170 can be reduced or narrowed.

When the first length (T1) of the second magnet 180 is decreased, in order to mitigate or compensate for the decrease of the output signal of the first position sensor 170 according to the decrease of the first length (T1) of the second magnet 180, a width of the second magnet 180 can be increased in a direction 108*a* heading towards a second side 105*b* from a first side 105*a* of an upper side 105.

In this case, the width of the second magnet 180 may correspond to a length of the second magnet 180 in a direction perpendicular to a direction heading towards a second side 105*b* from a first side 105*a* of an upper side 105 of the second magnet 180. For example, the width of the second magnet 180 may correspond to T3 in FIG. 10*a*, W1 in FIG. 10*b*, W11 and W12 in FIG. 10*c*, or W21 and W22 in FIG. 10*d*.

The first side 105*a* of the second magnet 180 may correspond to a side adjacent to an internal circumference surface of the housing 140 and the second side 105*b* of the second magnet 180 may correspond to a side facing the first side 105*a* and the side adjacent to an outer circumference surface of the housing 140. For example, the first side 105*a* may form a boundary line with a first side surface of the second magnet 180 facing an outer circumference surface of the bobbin 110 and the second side 105*b* may form a boundary line with a second side surface of the second magnet facing the first side surface.

The direction 108*a* heading towards the second side 105*b* from the first side 105*a* of the second magnet 180 can be parallel to a direction 108 heading towards an internal circumference surface 110*b* from an outer circumference surface 110*a* of the bobbin 110.

A length (D1) of the second side 105*b* of the second magnet 180 can be longer than a length (D2) of the first side 105*a* (D1>D2). For example, a shape of the upper side of the second magnet 180 may correspond to a shape of a trapezoid of which the first side 105*a* corresponds to a top side and the second side 105*b* corresponds to a bottom side. The first length (T1) of the second magnet 180 can be constant or uniform.

An upper side of the second magnet 180 and a lower side of the second magnet may have the same shape. In FIG. 10*a*, an angle formed by a lower surface 104 and a side surface 106 of the second magnet 180 corresponds to 90 degrees, by which the present invention may be non-limited. According to a different embodiment, the angle formed by the lower surface 104 and the side surface 106 of the second magnet 180 corresponds to an acute angle. According to a further different embodiment, the angle formed by the lower surface 104 and the side surface 106 of the second magnet 180 corresponds to an obtuse angle.

Figure 12:
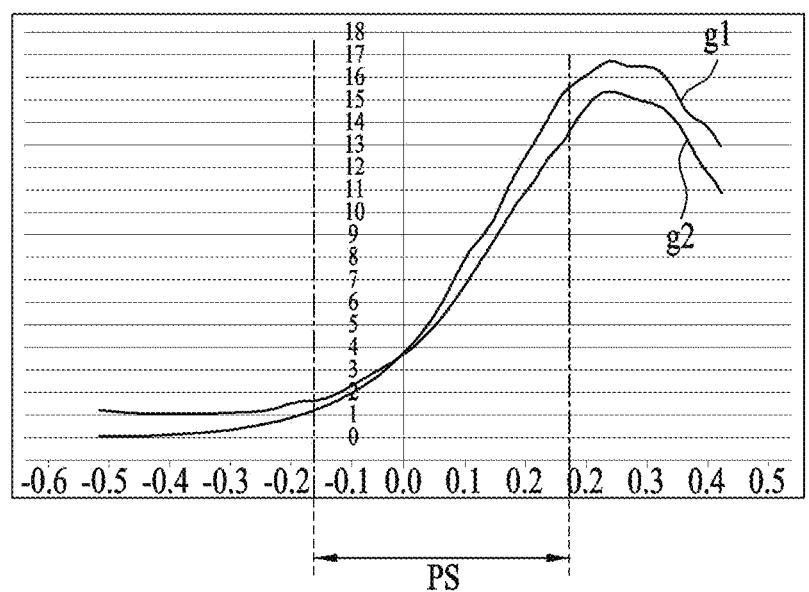
FIG. 12 illustrates an output of a first position sensor according to an embodiment.

FIG. 12 illustrates an output of the first position sensor 170 according to an embodiment. In this case, g1 corresponds to an output of the first position sensor 170 when the second magnet 180 shown in FIG. 10*a* is installed and g2 corresponds to an output of the first position sensor 170 when a width of an upper side of the second magnet is identical to a length of the first side 105*a* and the length is constant.

Referring to FIG. 12, an output range of the first position sensor 170 of g1 is wider than an output range of the first position sensor of g2 in an AF operating section (PS). For example, an output range may correspond to a section between an upper limit and a lower limit of an output of the first position sensor 170 within the AF operating section. If a width of the second magnet 180 increases in a direction 180*a* heading towards a second side 105*b* from a first side 105*a*, it may be able to secure a wider AF operating section according to an embodiment.

Since the second magnet 180 is inserted and mounted on the mounting groove 180*a* for mounting the second magnet through an opened upper part and the width of the second magnet 180 increases in a direction heading towards the second side 105*b* from the first side 105*a*, the second magnet 180 mounted on the mounting groove 180*a* for mounting the second magnet is not separated from the bobbin 110 in a direction heading towards the first side 105*a* from the second side 105*b*. In particular, according to an embodiment, it is able to easily assemble or mount the second magnet 180 and inhibit the second magnet 180 from being separated from the bobbin 110. And, it is not necessary to add an additional configuration to the bobbin 110 to inhibit the second magnet 180 from being separated from the bobbin 110. Moreover, it is not necessary to change a structure of the bobbin.

As mentioned earlier in FIG. 10a, according to an embodiment, it is able to suppress interference between the first magnet 130 and the second magnet 180-1, it is able to easily install the second magnet 180-1, it is able to inhibit the second magnet 180-1 from being separated from the bobbin 110, and it is able to increase a range of an output signal of the first position sensor 170.

Figure 10B:
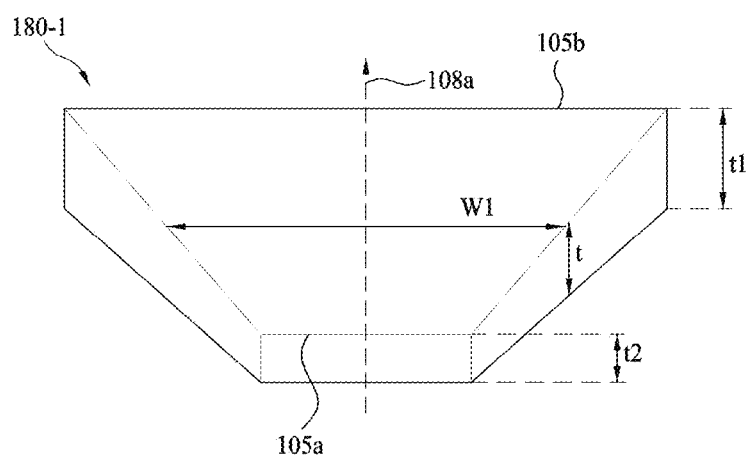

FIG. 10b illustrates a second magnet 180-1 according to a different embodiment.

Referring to FIG. 10b, the second magnet 180-1 is identical to the second magnet 180 mentioned earlier in the embodiment of FIG. 10a except a first length (t). The first length (t) of the second magnet 180-1 may increase in a direction heading towards a second side 105b from a first side 105a.

For example, a first length (t1) of a side surface of the second magnet 180 contacted with the second side 105b may be longer than a first length (t2) of a side surface contacted with the first side 105a (t1>t2).

If the first length (t) of the second magnet 180-1 is increased in the direction 108a heading towards the second side 105b from the first side 105a, it is able to more mitigate and compensate for the decrease of an output signal of the first position sensor 170.

According to the embodiment of FIG. 10b, it is able to suppress interference between the first magnet 130 and the second magnet 180-2, it is able to easily install the second magnet 180-2, it is able to inhibit the second magnet 180-2 from being separated from the bobbin 110, and it is able to increase a range of an output signal of the first position sensor 170.

Figure 10C:
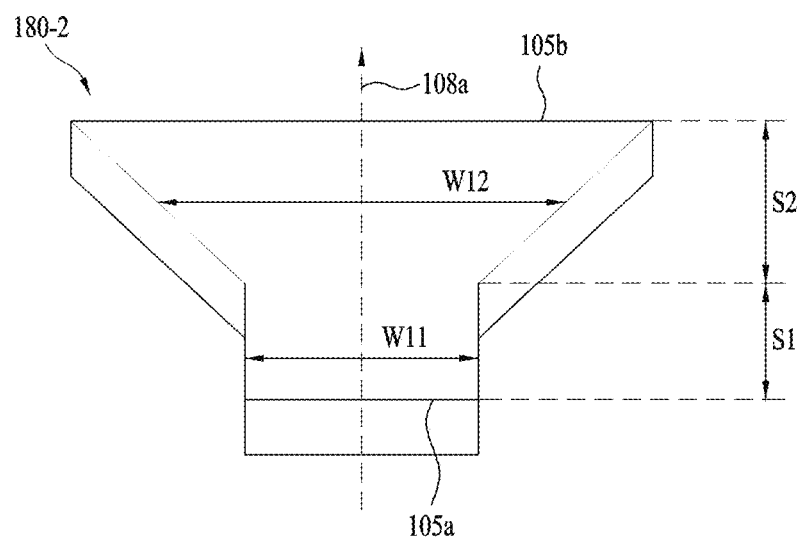

FIG. 10c illustrates a second magnet 180-2 according to a further different embodiment. A drawing reference number identical to FIG. 10a indicates the same configuration. Explanation on the same configuration is briefly described or omitted.

Referring to FIG. 10c, the second magnet 180-2 includes a first part (S1) including a first side 105a, a second side 105b, and a second part (S2) contacted with the first part (S1). A width (W11) of the first part (S1) of the second magnet 180-2 or a third length (corresponding to the third length (T3) in FIG. 10a) can be constant or uniform. A width (W12) of the second part (S2) of the second magnet 180-2 or a third length can be increased in a direction heading towards the second side 105b from the first side 105a.

A first length (corresponding to the first length (T1) in FIG. 10a) of the first part (s1) and a first length of the second part (S2) can be constant or uniform. Both of the first lengths can be identical to each other.

According to the embodiment of FIG. 10c, it is able to suppress interference between the first magnet 130 and the second magnet 180-2, it is able to easily install the second magnet 180-2, it is able to inhibit the second magnet 180-2 from being separated from the bobbin 110, and it is able to increase a range of an output signal of the first position sensor 170.

Figure 10D:
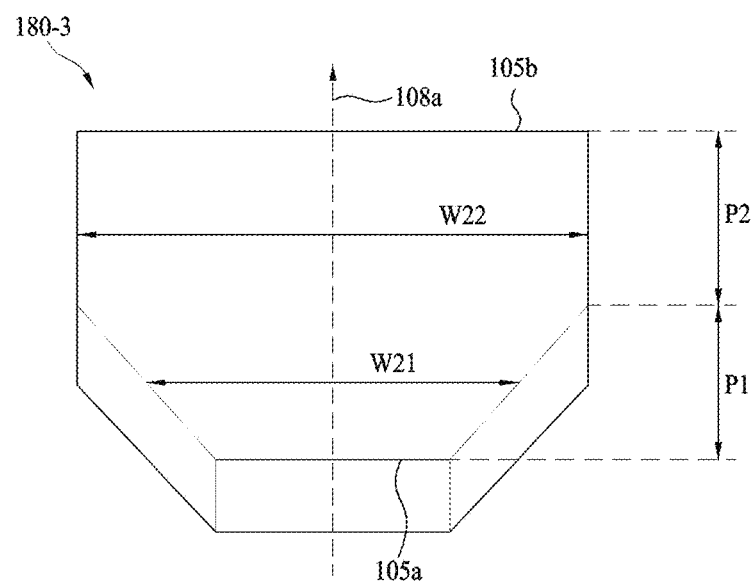

FIG. 10d illustrates a second magnet 180-3 according to a further different embodiment. A drawing reference number identical to FIG. 10a indicates the same configuration. Explanation on the same configuration is briefly described or omitted.

Referring to FIG. 10d, the second magnet 180-3 includes a first part (P1) including a first side 105a, a second side 105b, and a second part (P2) contacted with the first part (P1). A width (W21) of the first part (P1) of the second magnet 180-3 or a third length (corresponding to the third length (T3) in FIG. 10a) can be increased in a direction heading towards the second side 105b from the first side 105a.

A width (W22) of a second part (P2) of the second magnet 180-3 or a third length can be constant or uniform.

A first length (corresponding to the first length (T1) in FIG. 10a) of the first part (P1) and a first length of the second part (P2) can be constant or uniform. Both of the first lengths can be identical to each other.

According to the embodiment of FIG. 10d, it is able to suppress interference between the first magnet 130 and the second magnet 180-3, it is able to easily install the second magnet 180-3, it is able to inhibit the second magnet 180-3 from being separated from the bobbin 110, and it is able to increase a range of an output signal of the first position sensor 170.

Figure 10E:
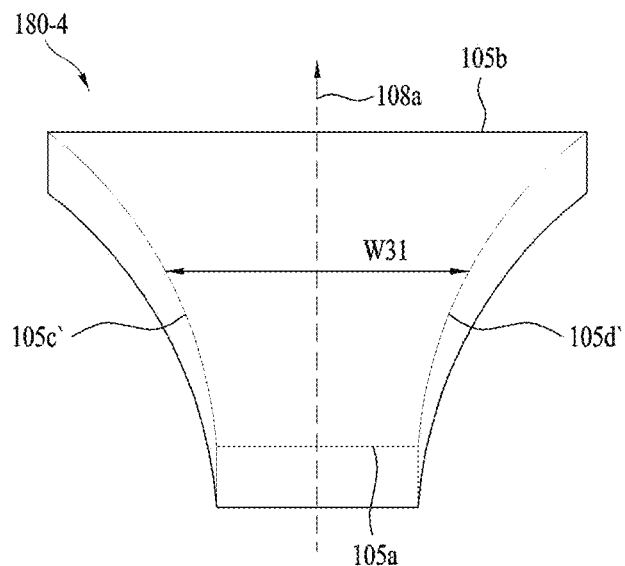

FIG. 10e illustrates a second magnet 180-4 according to a further different embodiment. A drawing reference number identical to FIG. 10a indicates the same configuration. Explanation on the same configuration is briefly described or omitted.

In FIG. 10a, a width of the second magnet 180 or a third length (T3) can be linearly increased in a direction heading towards the second side 105b from the first side 105a. On the contrary, in FIG. 10e, a width (W31) of the second magnet 180-4 or a third length can be non-linearly increased in a direction heading towards the second side 105b from the first side 105a.

In FIG. 10e, a third side 105c and a fourth side 105d of the second magnet 180-4 may correspond to concave curves.

The third magnet plays a role in mitigating or eliminating the influence on the first coil 120 influenced by magnetic flux of the second magnet 180.

For example, the third magnet 185 and the second magnet 180 may have the same shape and can be symmetrically disposed on the bobbin 110. And, for example, the magnetic flux of the third magnet 185 may be identical to the magnetic flux of the second magnetic 180, by which the present invention may be non-limited. According to a different embodiment, the magnetic flux of the third magnet 185 may be different from the magnetic flux of the second magnetic 180.

Explanation on the second magnet 180 can be identically applied to the third magnet 185. According to a different embodiment, the third magnet 185 can be omitted.

In the embodiments of FIGS. 10b to 10d, the third magnet and the second magnet 180-1 to 180-4 may have the same shape. Explanation on the second magnet 180-1 to 180-4 can be identically applied to the third magnet.

FIGS. 10a and 10e illustrate the embodiments of the second magnet. According to a different embodiment, the second magnet can be implemented in various shapes including a diamond, a triangle, and the like.

The magnetic flux of the first magnet 130 may be different from the magnetic flux of the second magnet 180. For example, the magnetic flux of the first magnet 130 may be greater than the magnetic flux of the second magnet 180, by which the present invention may be non-limited. According to a different embodiment, the magnetic flux of the first magnet 130 may be equal to or less than the magnetic flux of the second magnet 180.

And, a material and a grade of the first magnet 130 may differ from those of the second magnet 180, by which the present invention may be non-limited. Depending on an embodiment, the material and the grade of the first magnet may be identical to those of the second magnet.

The first magnet 130 and the second magnet 180 may have a different rate of change of magnetic characteristic for temperature, by which the present invention may be non-limited. Depending on an embodiment, the first magnet 130 and the second magnet 180 may have the same rate of change of magnetic characteristic for temperature.

FIGS. 10a to 10e illustrate an embodiment that the first length (T1) of the second magnet 10 is shorter than the second length (T2) and the third length (T3). Yet, the first length (T1) of the second magnet 10 may be equal to or longer than the second length (T2) or the third length (T3) depending on an embodiment. A width of the second magnet can be increased in a direction heading towards a second side from a first side of an upper side of the second magnet.

Figure 13:
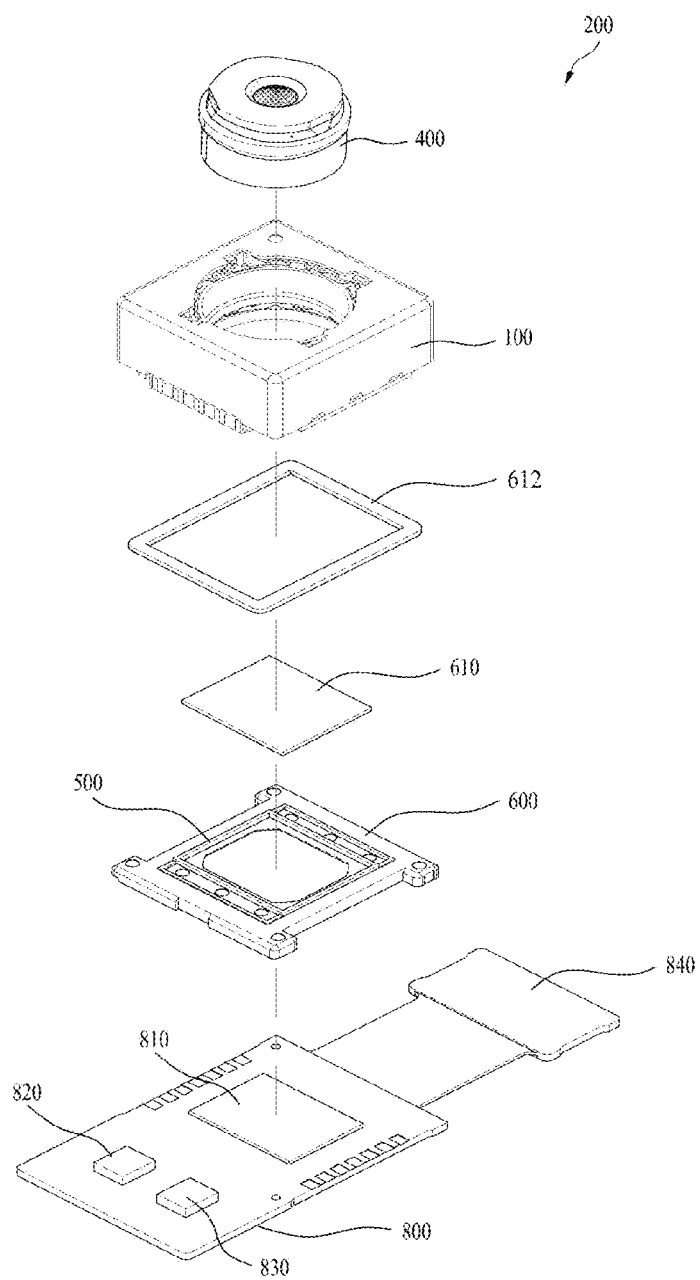
FIG. 13 is a perspective diagram for a camera module according to an embodiment.

FIG. 13 is a perspective diagram for a camera module according to an embodiment.

Referring to FIG. 13, a camera module can include a lens barrel 400, a lens driving device 100, an adhesive member 612, a filter 610, a first holder 800, an image sensor 810, a motion sensor 820, a controller 830, and a connector 840.

The lens barrel 400 can be installed in the bobbin 110 of the lens driving device 100.

The first holder 600 can be disposed on the bottom of the base 210 of the lens driving device 100. The filter 610 is installed in the first holder 600 and the first holder 600 can be equipped with a protrusion unit 500 on which the filter 610 is mounted.

The adhesive member 612 can make the base 210 of the lens driving device 100 to be coupled or attached with the first holder 600. The adhesive member 612 may play a role in inhibiting a foreign substance from being brought into the inside of the lens driving device 100 as well as the above-mentioned adhesive role.

For example, the adhesive member 612 may correspond to epoxy, thermosetting adhesive, UV curing adhesive, and the like.

The filter 610 may play a role in inhibiting a light of a specific frequency band among lights passing through the lens barrel 400 from being emitted to the image sensor 810. The filter 610 may correspond to an infrared cutoff filter, by which the present invention may be non-limited. In this case, the filter 610 can be disposed in a manner of being parallel to x-y plane.

A hollow can be formed near the first holder 600 on which the filter 610 is mounted to make a light passing through the filter 610 to be emitted to the image sensor 810.

The second holder 800 is disposed on the bottom of the first holder 600 and the image sensor 810 can be mounted on the second holder 600. A light passing through the filter 610 is emitted to the image sensor 810 and an image included in the light is focused on the image sensor.

In order to convert the image focused on the image sensor 810 into an electrical signal and transmit the electrical signal to an external device, the second holder 800 can include various circuits, elements, a controller, and the like.

The second holder 800 may include an image sensor, form a circuit pattern, and can be implemented by a circuit board on which various elements are combined.

The image sensor 810 receives an image included in a light emitted through the lens driving device 100 and can convert the received image into an electrical signal.

The filter 610 and the image sensor 810 can be disposed in first direction in a manner of being separated from each other to make the filter 610 and the image sensor 810 face each other.

The motion sensor 820 is mounted on the second holder 800 and can be electronically connected with the controller 830 via a circuit pattern prepared at the second holder 800.

The motion sensor 820 outputs rotating angular speed information in response to a movement of the camera module 200. The motion sensor 820 can be implemented by twinaxial or triaxial gyro sensor, or an angular speed sensor. The motion sensor 820 can be configured irrespective of a hand-tremor controller 830, by which the present invention may be non-limited. According to a different embodiment, the motion sensor can be configured to be included in the controller 830.

The controller 830 is mounted on the second holder 800 and can be electronically connected with the first coil 120 of the lens driving device 100, the first position sensor 170, the second position sensor 240, and the second coil 230.

The controller 830 can provide a driving signal or power to the first coil 120 and the second coil 230.

The controller 830 can provide a driving signal to the first position sensor 170 and the second position sensor 240.

The controller 830 receives an output of the first position sensor 170 and can perform feedback autofocusing on AF driving unit of the lens driving device 100 based on an output signal and rotating angular speed information of the motion sensor provided by the first position sensor 170.

For example, the second holder 800 can be electronically connected with the circuit board 250 of the lens driving device 100 and the controller 830 mounted on the second holder 800 can be electronically connected with the first coil 120, the first position sensor 170, the second position sensor 240, and the second coil 230 via the circuit board 250.

The controller 830 can perform feedback image stabilization on an OIS driving unit of the lens driving device 100 based on output signals and the rotating angular speed information provided by the second position sensor 240 of the lens driving device 100.

The connector 840 is electronically connected with the second holder 800 and can include a port for electronically connecting with an external device.

Figure 14:
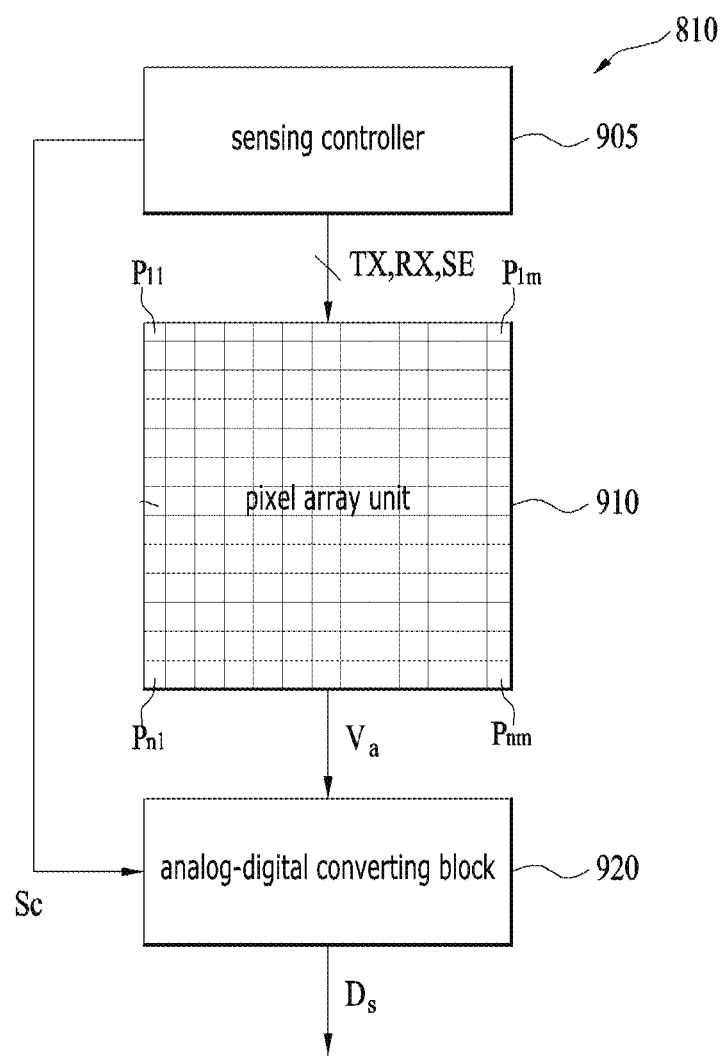
FIG. 14 is a block diagram for an image sensor shown in FIG. 13 according to an embodiment.

FIG. 14 is a block diagram for an image sensor 810 shown in FIG. 13 according to an embodiment.

Referring to FIG. 14, the image sensor 810 includes a sensing controller 905, a pixel array unit 910, and an analog-digital converting block 920.

The sensing controller 905 outputs control signals (e.g., a reset signal (RX), a transmission signal (TX), a selection signal (SX) for controlling transistors included in the pixel array unit 910 and control signals (Sc) for controlling the analog-digital converting block 130.

The pixel array unit 910 include a plurality of unit pixels (P11 to Pnm, n, m>1 natural number). A plurality of the unit pixels (P11 to Pnm) can be arrayed to have a matrix shape consisting of rows and columns. Each of a plurality of the unit pixels (P11 to Pnm) may correspond to a photoelectric transformation element that senses a light and coverts the sensed light into an electrical signal.

The pixel array unit 910 can include sensing lines connected with output ends of the unit pixels (P11 to Pnm).

For example, each of a plurality of the unit pixels (P11 to Pnm) can include a photodiode, a transfer transistor, a reset transistor, a drive transistor, and a select transistor, by which the present invention may be non-limited. The number of transistors included in a unit pixel may correspond to 3 or 5 rather than 4.

The photodiode absorbs light and may be able to generate an electric charge using the absorbed light.

The transfer transistor can transmit an electric charge generated by the photodiode to a sensing node (e.g., floating diffusion region) in response to a transmission signal (TX). The reset transistor can reset a unit pixel in response to a reset signal (RX). The drive transistor can be controlled in response to voltage of a sensing node, can be implemented by a source follower, and can play a role of a buffer. The select transistor can be controlled by a selection signal (SE) and can output a sensed signal (Va) to an output terminal of a unit pixel.

The analog-digital converting block 920 performs sampling on a sensing signal (Va) corresponding to an analog signal outputted from the pixel array unit 905 and converts the sampled sensing signal into a digital signal (Ds). The analog-digital converting block 920 can perform CDS (correlated double sampling) to get rid of a pixel-specific fixed pattern noise.

The sensing controller 905 and the analog-digital converting block 920 can be implemented irrespective of the controller 830, by which the present invention may be non-limited. The sensing controller 905, the analog-digital converting block 920, and the controller 830 can be implemented as a signal controller or a control block.

Figure 15:
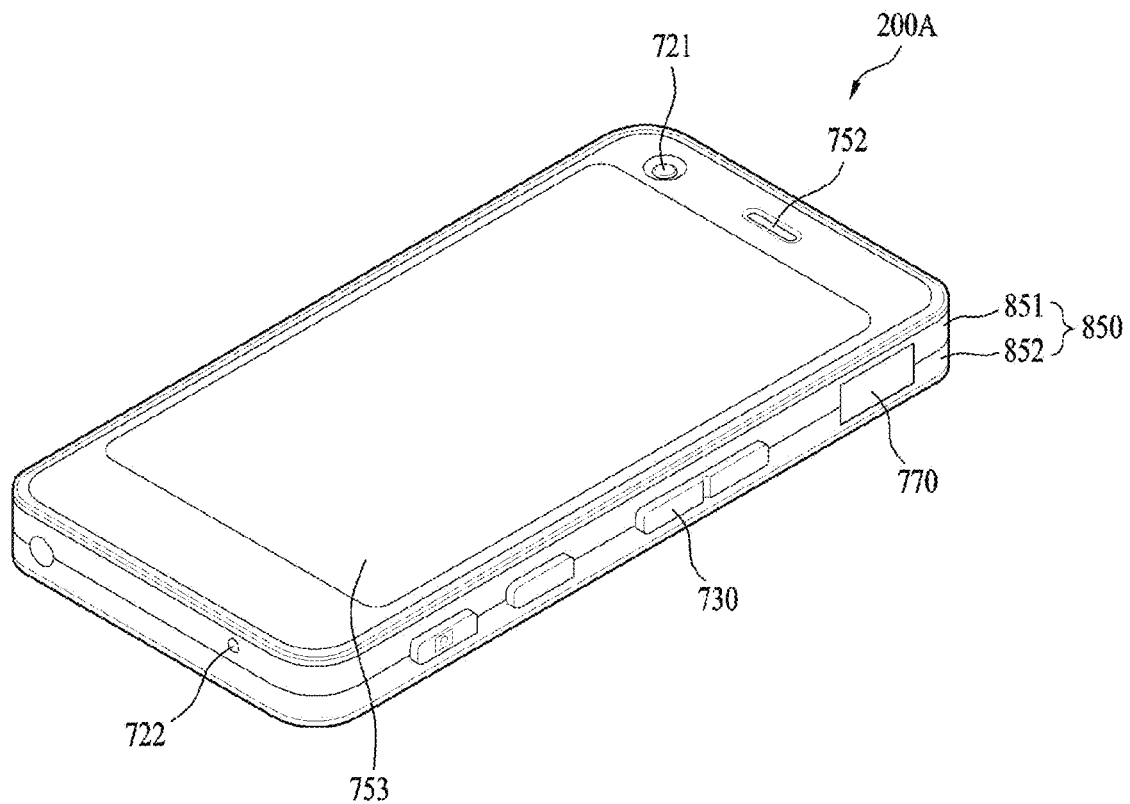
FIG. 15 is a perspective diagram for a portable terminal according to an embodiment.
Figure 16:
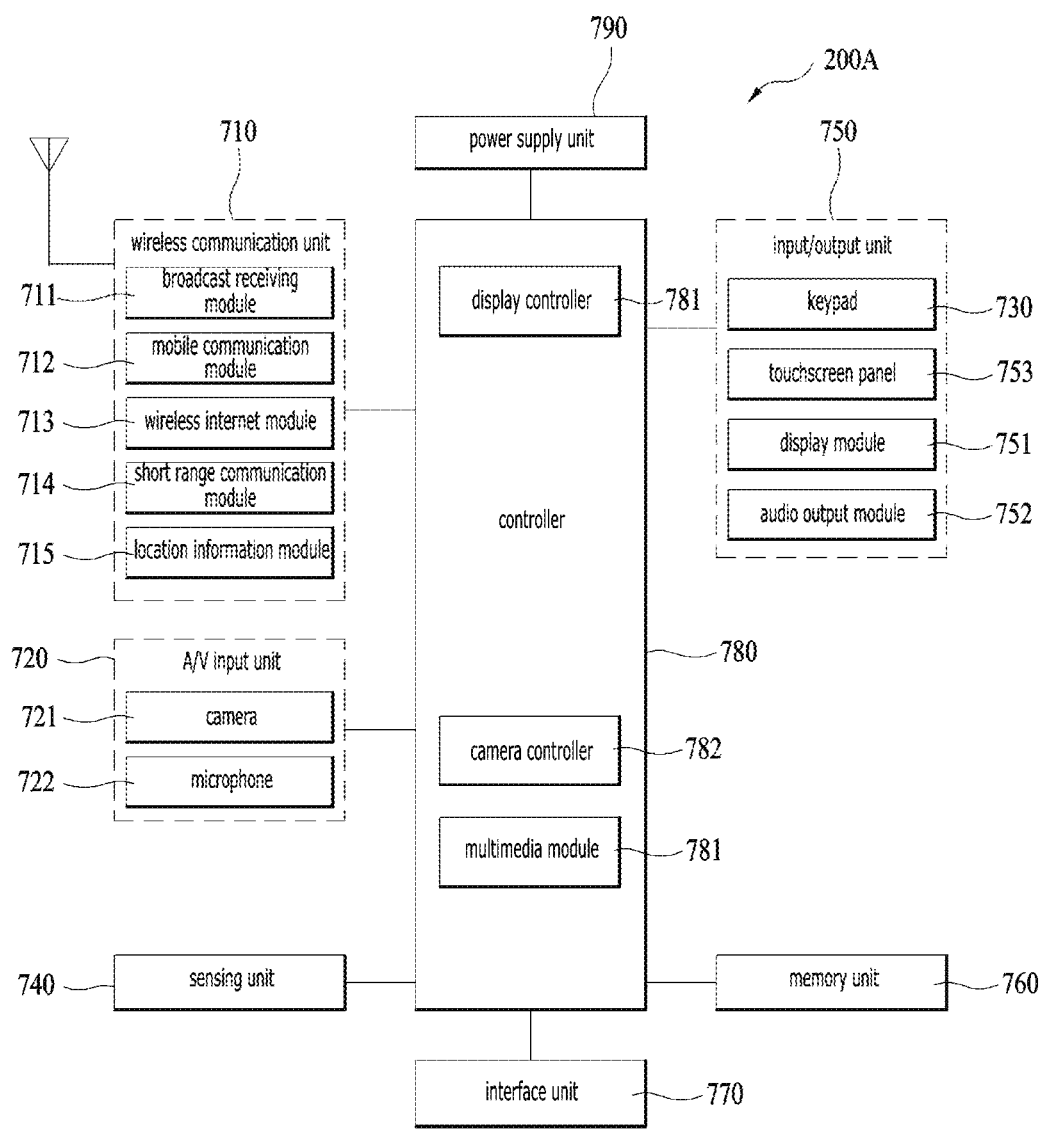
FIG. 16 is a diagram for a configuration of a portable terminal shown in FIG. 15.

FIG. 15 is a perspective diagram for a portable terminal 200A according to an embodiment and FIG. 16 is a diagram for a configuration of the portable terminal shown in FIG. 15.

Referring to FIGS. 15 and 16, a portable terminal 200a (hereinafter, a terminal) can include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 15 has a shape of a bar, by which the present invention may be non-limited. The body may have various structures including a slide type capable of making two or more sub-bodies to be slidably coupled, a folder type, a swing type, a swirl type, and the like.

The body 850 can include cases (casing, housing, cover, etc.) constructing an exterior. For example, the body 850 can be divided into a front case 851 and a rear case 852. Various electronic parts of a terminal can be included in a space formed between the front case 851 and the rear case 852.

The wireless communication unit 710 can include one or more modules that enable wireless communication between a terminal 200A and a wireless communication system or wireless communication between the terminal 200A and a network to which the terminal 200A belongs thereto.

For example, the wireless communication unit 710 can include a broadcast receiving module 711, a mobile communication module 712, a wireless internet module 713, a short range communication module 714, and a location information module 715.

The A/V (audio/video) input unit 720 can include a camera 721 and a microphone 722 to input an audio signal or a video signal.

The camera 721 can include the camera module 200 according to the embodiment mentioned earlier in FIG. 13.

The sensing unit 740 senses a current status of a terminal 200A such as open/close status of the terminal 200A, a location of the terminal 200A, information on whether or not a user is contacted with the terminal, an orientation of the terminal 200A, acceleration/reduction of the terminal 200A, and the like and can generate a sensing signal for controlling an operation of the terminal 200A. For example, if the terminal 200A has a form of a slide phone, the sensing unit can sense whether or not the slide phone is opened. And, the sensing unit can sense whether or not the power supply unit 790 supplies power, whether or not the interface unit 770 is coupled with an external device, and the like.

The input/output unit 750 can generate an input or an output related to a sense of sight, a sense of hearing, or a sense of touching. The input/output unit 750 can generate an input data for controlling an operation of the terminal 200A and can display information processed in the terminal 200A.

The input/output unit 750 can include a keypad 730, a display module 751, an audio output module 752, and a touch screen panel 753. The keypad 730 can generate an input data using a keypad input.

The display module 751 can include a plurality of pixels of which color is changed according to an electrical signal. For example, the display module 751 can include at least one selected from the group consisting of a liquid crystal display, a thin film transistor-liquid crystal display, an organic light-emitting diode, a flexible display, a 3D display.

The audio output module 752 can output audio data received from the wireless communication unit 710 or audio data stored in the memory unit 760 in a call signal reception mode, a calling mode, a recording mode, a voice recognition mode, or a broadcast reception mode.

The touch screen panel 753 can covert a change of capacitance, which is changed by a user touch touched on a specific region of a touch screen, into an electrical input signal.

The memory unit 760 can store a program for performing process and control of the controller 780 and can temporarily store input/output data (e.g., telephone number, message, audio, still image, picture, video, etc.). For example, the memory unit 760 can store an image (a picture or a video) captured by the camera 721.

The interface unit 770 plays a role of a path between the terminal 200A and an external device connected with the terminal. The interface unit 770 receives data or receives power from an external device and forwards the power to each configuration element of the terminal 200A. Or, the interface unit can make internal data of the terminal 200A to be transmitted to an external device. For example, the interface unit 770 can include a wired/wireless headset port, an external charging port, a wired/wireless data port, a memory card port, a port for connecting a device equipped with an identification module, an audio I/O (input/output) port, a video I/O (input/output) port, an earphone port, and the like.

The controller 780 can control overall operation of the terminal 200A. For example, the controller 780 can perform relevant controlling and processing on voice call, data communication, video call, and the like.

The controller 780 can include a multimedia module 781 for playing multimedia. The multimedia module 781 can be implemented within the controller 780 or can be implemented irrespective of the controller 780.

The controller 780 can include a display controller 781 configured to generate display control signals for driving the display unit 751 and a camera controller 782 configured to generate camera control signals for driving the camera 721.

The controller 780 can perform pattern recognition processing capable of recognizing a writing input or a drawing input performed on a touch screen as a letter and an image, respectively.

The power supply unit 790 receives external power or internal power according to a control of the controller 780 and can provide the power to each of configuration elements.

The features, the structures, the effects and the like mentioned in the foregoing embodiments are included in at least one embodiment of the present invention and the features, the structures, the effects and the like are not restricted to one embodiment only. Moreover, the features, the structures, the effects and the like described in each of the embodiments can be implemented in a manner of being combined or modified by those skilled in the art. Hence, the contents related to the combination and the modification should be construed as being included in the scope of the present invention.

INDUSTRIAL APPLICABILITY

The embodiment of the present invention can be applied to a lens driving device capable of securing precise AF driving by suppressing interference between magnet for driving and magnet for sensing and obtaining position sensor output of a preferred range, a camera module including the lens driving device, and an optical device.

The invention claimed is:

1. A lens driving device, comprising:
a housing;
a bobbin disposed in the housing;
a first coil disposed on an outer surface of the bobbin;
a first magnet disposed on the housing;
a second magnet disposed on the bobbin and spaced apart from the first coil; and
a position sensor disposed on the housing and configured to sense a magnetic field of the second magnet,
wherein a width of at least a part of the second magnet increases in a first direction,
wherein the first direction is perpendicular to an optical axis direction and extends towards an inner circumferential surface of the bobbin from an outer circumferential surface of the bobbin, and
wherein the width is a length of the at least a part of the second magnet in a second direction perpendicular to the first direction and the optical axis direction.

2. The lens driving device of claim 1, wherein a length of the second magnet in the optical axis direction is longer than the length of the second magnet in the first direction.

3. The lens driving device of claim 2, wherein the length of the second magnet in the optical axis direction is longer than a length of the at least a part of the second magnet in the second direction perpendicular to the first direction and the optical axis direction.

4. The lens driving device of claim 1, wherein the width of at least a part of the second magnet increases in a direction extending towards a second side from a first side of an upper surface of the second magnet, wherein the first side corresponds to a side adjacent to an inner surface of the housing, and wherein the second side corresponds to a side facing the outer surface of the bobbin and the first side.

5. The lens driving device of claim 2, wherein the bobbin comprises a mounting groove provided at an upper surface of the bobbin for the second magnet and wherein a width of at least a part of the mounting groove increases in a direction extending towards an inner surface from the outer surface of the bobbin.

6. The lens driving device of claim 5, wherein a length of the second magnet in the direction of the optical axis is constant.

7. The lens driving device of claim 1, wherein an upper surface of at least a part of the second magnet has a shape of a trapezoid and wherein a lower surface of the second magnet have a same shape.

8. A lens driving device, comprising:
a housing;
a bobbin disposed in the housing;
a first coil disposed on an outer surface of the bobbin;
a first magnet disposed on the housing;
a second magnet disposed on the bobbin and spaced apart from the first coil; and
a first position sensor disposed on the housing and configured to sense a magnetic field of the second magnet,
wherein an upper surface of at least a part of the second magnet has a shape of a trapezoid, and
wherein a length of the second magnet in an optical axis direction is longer than the length of the second magnet in a first direction perpendicular to the optical axis direction.

9. The lens driving device of claim 8, wherein the length of the second magnet in the optical axis direction is longer than a length of the at least a part of the second magnet in a second direction perpendicular to the first direction and the optical axis direction.

10. The lens driving device of claim 1, wherein the housing comprises first sides and second sides, wherein the first magnet is disposed on the first sides, and wherein the position sensor is disposed on one of the second sides.

11. The lens driving device of claim 10, comprising a circuit board disposed on one of the second sides and comprising pads electronically connected with the position sensor.

12. The lens driving device of claim 11, comprising an upper elastic member and a lower elastic member connected with the bobbin and the housing,
wherein the upper elastic member is divided into a plurality of upper elastic members and wherein the plurality of the upper elastic members is electronically connected with the pads.

13. The lens driving device of claim 12, comprising supporting members configured to electronically connect the plurality of the upper elastic members with the circuit board.

14. The lens driving device of claim 8, wherein the bobbin comprises a mounting groove provided at an upper surface of the bobbin for the second magnet and wherein a width of at least a part of the mounting groove increases in a direction heading towards an inner surface from the outer surface of the bobbin.

15. The lens driving device of claim 14, wherein the mounting groove of the bobbin comprises an opening exposed to an outer circumference surface of the bobbin in a form that an upper part of the mounting groove is opened.

16. The lens driving device of claim 1, wherein the second magnet is not overlapped with the first magnet in a direction perpendicular to the optical axis direction at an initial position of the bobbin.

17. A camera module, comprising:
a lens;
a lens driving device of claim 1 configured to move the lens; and
an image sensor configured to covert an image from the lens into an electrical signal.

18. A camera module, comprising:
a lens;
a lens driving device configured to move the lens and the lens driving device described in claim 8;

an image sensor configured to covert an image emitted via the lens driving device into an electrical signal.

* * * * *